(12) United States Patent
Han et al.

(10) Patent No.: US 11,882,522 B2
(45) Date of Patent: Jan. 23, 2024

(54) INFORMATION TRANSMISSION METHOD AND COMMUNICATION APPARATUS

(71) Applicant: HUAWEI TECHNOLOGIES CO., LTD., Shenzhen (CN)

(72) Inventors: Xiao Han, Shenzhen (CN); Yuchen Guo, Shenzhen (CN); Jian Yu, Shenzhen (CN); Dandan Liang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 299 days.

(21) Appl. No.: 17/345,528

(22) Filed: Jun. 11, 2021

(65) Prior Publication Data

US 2021/0306955 A1    Sep. 30, 2021

Related U.S. Application Data

(63) Continuation of application No. PCT/CN2019/124667, filed on Dec. 11, 2019.

(30) Foreign Application Priority Data

Dec. 12, 2018   (CN) .......................... 201811519663.9

(51) Int. Cl.
*G08C 17/00* (2006.01)
*H04W 52/02* (2009.01)
*H04W 16/02* (2009.01)

(52) U.S. Cl.
CPC ....... *H04W 52/0248* (2013.01); *H04W 16/02* (2013.01)

(58) Field of Classification Search
CPC ......... H04W 52/0219; H04W 52/0248; H04W 72/121; H04W 52/02
See application file for complete search history.

(56) References Cited

U.S. PATENT DOCUMENTS

2012/0263090 A1    10/2012   Porat et al.
2014/0328270 A1*   11/2014   Zhu .................... H04W 74/002
                                                370/329
(Continued)

FOREIGN PATENT DOCUMENTS

CN    106998582 A    8/2017
WO    2017124850 A1  7/2017

OTHER PUBLICATIONS

Dr. Siegfried Voigt, TWT's in Space-Present Status and Future Applications, 2009 IEEE International Vacuum Electronics Conference, Date of Conference: Apr. 28-30, 2009,Date Added to IEEE Xplore: Aug. 7, 2009, total 4 pages.

(Continued)

*Primary Examiner* — Shantell L Heiber
(74) *Attorney, Agent, or Firm* — HAUPTMAN HAM, LLP

(57) ABSTRACT

This application provides an information transmission method and a communication apparatus. The method includes: A first device sends TWT resource configuration information in a first BSS to a second device. The first device is located in the first BSS, the second device is located in a second BSS, and the first BSS and the second BSS at least partially overlap. According to the information transmission method provided in this application, TWT resource configuration information in a plurality of BSSs is shared among the plurality of BSSs in an OBSS scenario. Therefore, collision can be further avoided during data transmission in different BSSs in the OBSS scenario, thereby improving quality and assurance of data transmission between devices in the plurality of BSSs, and improving efficiency of data transmission in the OBSS scenario.

20 Claims, 10 Drawing Sheets

(56) References Cited

U.S. PATENT DOCUMENTS

| | | | |
|---|---|---|---|
| 2016/0381704 A1 | 12/2016 | Chu et al. | |
| 2018/0115950 A1* | 4/2018 | Asterjadhi | ............ H04W 76/28 |
| 2018/0184435 A1* | 6/2018 | Cariou | .............. H04W 52/0203 |
| 2018/0295573 A1 | 10/2018 | Gidvani et al. | |
| 2019/0007973 A1* | 1/2019 | Lou | ................... H04W 74/0816 |

OTHER PUBLICATIONS

IEEE 802.11-18/1525r1, Jeongki Kim et al., EHT features for Multi-Band Operation, Sep. 2018, total 12 pages.

IEEE Std 802.11TM-2016, IEEE Standard for Information technology-Telecommunications and information exchange between systems Local and metropolitan area networks-Specific requirements, Part 11: Wireless LAN Medium Access Control (MAC) and Physical Layer (PHY) Specifications, Approved Dec. 7, 2016, total 3534 pages.

International Search Report issued in corresponding International Application No. PCT/CN2019/124667, dated Mar. 12, 2020, pp. 1-8.

* cited by examiner

200

Determine an operating mode of a second frequency band in a first period, where the operating mode of the second frequency band includes one or more of EDCA and EDCA disable, and the EDCA and the EDCA disable are in different periods of the second frequency band ~ S210

Determine, based on the operating mode of the second frequency band in the first period, whether to bind a first frequency band and the second frequency band in the first period ~ S220

FIG. 9

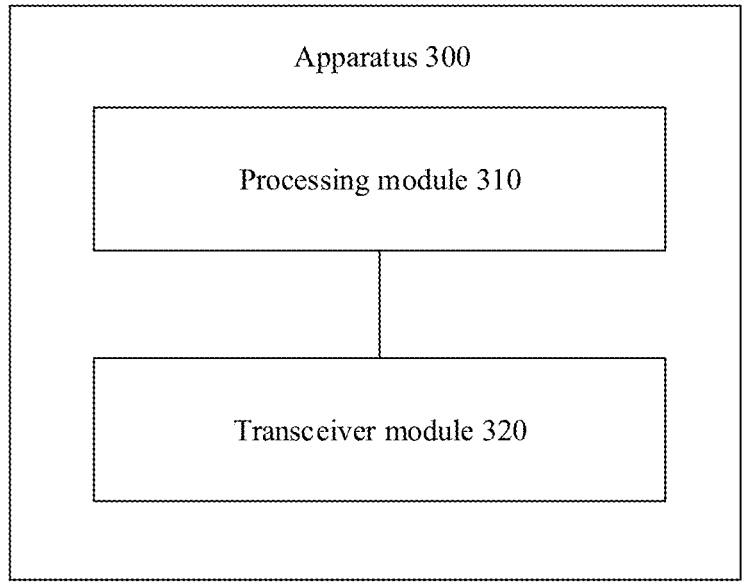

FIG. 10

INFORMATION TRANSMISSION METHOD AND COMMUNICATION APPARATUS

CROSS-REFERENCE TO RELATED APPLICATIONS

This application is a continuation of International Application No. PCT/CN2019/124667, filed on Dec. 11, 2019, which claims priority to Chinese Patent Application No. 201811519663.9, filed on Dec. 12, 2018. The disclosures of the aforementioned applications are hereby incorporated by reference in their entireties.

TECHNICAL FIELD

This application relates to the communication field, and more specifically, to an information transmission method and a communication apparatus.

BACKGROUND

A target wake time (target wake time, TWT) was first proposed in the 802.11ah standard, and was originally intended to enable a light-traffic device to stay in a sleep state for as long as possible, so as to achieve low power consumption. After TWT communication is established, both a requesting station and a responding station remain in an active state within an agreed-upon TWT service period (service period, SP), to send and receive data. Beyond the TWT service period, the requesting station and/or the responding station may fall asleep to save energy.

Currently, TWT communication is established between stations in one basic service set (basic service set, BSS). For data transmission in a case in which a plurality of BSSs overlap, time-frequency resources for TWT service periods in different BSSs may collide. As a result, interference may exist between data transmission in different BSSs, thereby affecting quality and efficiency of the data transmission in different BSSs, and deteriorating communication quality.

SUMMARY

This application provides an information transmission method and a communication apparatus, to share TWT resource configuration information in a plurality of BSSs among the plurality of BSSs in an OBSS scenario, thereby improving quality and assurance of data transmission between devices in the plurality of BSSs, and improving efficiency of data transmission in the OBSS scenario.

According to a first aspect, an information transmission method is provided. The method may be performed by a first device or a chip used for a first device. The first device is located in a first BSS. A second device is located in a second BSS. The first BSS and the second BSS at least partially overlap. The method includes: The first device sends TWT resource configuration information in the first BSS to the second device.

According to the information transmission method provided in this application, TWT resource configuration information in a plurality of BSSs is shared among the plurality of BSSs in an OBSS scenario. Therefore, collision can be further avoided during data transmission in different BSSs in the OBSS scenario, thereby improving quality and assurance of data transmission between devices in the plurality of BSSs, and improving efficiency of data transmission in the OBSS scenario.

In a possible implementation of the first aspect, the first device may be an AP or a STA in the first BSS, and the second device may be an AP or a STA in the second BSS.

In a possible implementation of the first aspect, the TWT resource configuration information in the first BSS includes one or more of the following fields: a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

In a possible implementation of the first aspect, the TWT resource configuration information in the first BSS includes the following fields: an element ID field, a length field, an information element ID extension field, a TWT coordination control field, a number of TWT period field and at least one per TWT period info field. The TWT coordination control field includes a TWT coordination enabled field and a number of overlapping BSS/access point AP field. The per TWT period info field includes a target wake time field, a TWT wake duration field, a TWT channel field, a spatial reuse allowed field, and an access class field.

In a possible implementation of the first aspect, the TWT resource configuration information in the first BSS further includes one or more of the following fields: a field indicating whether a TWT period is periodic, and a field indicating a TWT wake interval.

In a possible implementation of the first aspect, the TWT resource configuration information in the first BSS includes the following fields: an element ID field, a length field, an information element ID extension field, a TWT coordination control field, and a TWT coordination information field. The TWT coordination control field includes a TWT coordination enabled field, a number of overlapping BSS/AP field, a periodic field or an aperiodic field, and a reserved field. When the TWT coordination control field includes the periodic field, the TWT coordination information field includes a target wake time field, a TWT wake duration field, a TWT wake interval mantissa field, a TWT wake interval exponent field, a TWT channel field, a spatial reuse allowed field, and an access class field. When the TWT coordination control field includes the aperiodic field, the TWT coordination information field includes a number of TWT period field and at least one per TWT period info field. The per TWT period info field includes a target wake time field, a TWT wake duration field, a TWT channel field, a spatial reuse allowed field, and an access class field.

In a possible implementation of the first aspect, the TWT resource configuration information in the first BSS is carried in a beacon (Beacon) frame.

In a possible implementation of the first aspect, that the first device sends TWT resource configuration information in the first BSS to the second device includes: The first device sends the TWT resource configuration information in the first BSS to the second device on a primary channel of the first device. Alternatively, the first device sends the TWT resource configuration information in the first BSS to the second device on a primary channel of the second device. Alternatively, the first device sends the TWT resource configuration information in the first BSS to the second device on a common channel.

In a possible implementation of the first aspect, the method further includes: The first device obtains TWT resource configuration information in the second BSS. The first device determines a data transmission resource in the first BSS based on the TWT resource configuration information in the second BSS. In this implementation, the first device determines the data transmission resource in the first BSS based on the TWT resource configuration information in the second BSS and with reference to the TWT resource configuration information in the first BSS. This can avoid transmission collision that may occur when devices in the first BSS and the second BSS perform data transmission, avoid interference during data transmission, improve efficiency and assurance of data transmission, and improve resource utilization.

In a possible implementation of the first aspect, a ratio of a quantity of data transmission resources in the first BSS to a total quantity of resources is less than a first threshold, and the total quantity of resources is a sum of the quantity of data transmission resources in the first BSS and a quantity of data transmission resources in the second BSS.

In a possible implementation of the first aspect, the total quantity of resources is total bandwidth or a total quantity of slots, and the first threshold is $1/(N+1)$, where N is the quantity of BSSs overlapping with the first BSS.

According to a second aspect, an information transmission method is provided. The method may be performed by a second device or a chip used for a second device. A first device is located in a first BSS. The second device is located in a second BSS. The first BSS and the second BSS at least partially overlap. The method includes: The second device receives TWT resource configuration information that is in the first BSS and that is sent by the first device, where the first device is located in the first BSS, the second device is located in the second BSS, and the first BSS and the second BSS at least partially overlap.

In a possible implementation of the second aspect, the TWT resource configuration information in the first BSS includes one or more of the following fields: a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

In a possible implementation of the second aspect, the TWT resource configuration information in the first BSS includes the following fields: an element ID field, a length field, an information element ID extension field, a TWT coordination control field, a number of TWT period field and at least one per TWT period info field. The TWT coordination control field includes a TWT coordination enabled field and a number of overlapping BSS/access point AP field. The per TWT period info field includes a target wake time field, a TWT wake duration field, a TWT channel field, a spatial reuse allowed field, and an access class field.

In a possible implementation of the second aspect, the TWT resource configuration information in the first BSS further includes one or more of the following fields: a field indicating whether a TWT period is periodic, and a field indicating an interval between a plurality of TWT periods.

In a possible implementation of the second aspect, the TWT resource configuration information in the first BSS includes the following fields: an element ID field, a length field, an information element ID extension field, a TWT coordination control field, and a TWT coordination information field. The TWT coordination control field includes a TWT coordination enabled field, a number of overlapping BSS/AP field, a periodic field or an aperiodic field, and a reserved field. When the TWT coordination control field includes the periodic field, the TWT coordination information field includes a target wake time field, a TWT wake duration field, a TWT wake interval mantissa field, a TWT wake interval exponent field, a TWT channel field, a spatial reuse allowed field, and an access class field. When the TWT coordination control field includes the aperiodic field, the TWT coordination information field includes a number of TWT period field and at least one per TWT period info field. The per TWT period info field includes a target wake time field, a TWT wake duration field, a TWT channel field, a spatial reuse allowed field, and an access class field.

In a possible implementation of the second aspect, the TWT resource configuration information in the first BSS is carried in a beacon (Beacon) frame.

In a possible implementation of the second aspect, that the second device receives TWT resource configuration information that is in the first BSS and that is sent by the first device includes: The second device receives, on a primary channel of the first device, the TWT resource configuration information that is in the first BSS and that is sent by the first device; or the second device receives, on a primary channel of the second device, the TWT resource configuration information that is in the first BSS and that is sent by the first device.

In a possible implementation of the second aspect, the method further includes: The second device determines a data transmission resource in the second BSS based on the TWT resource configuration information in the first BSS.

In a possible implementation of the second aspect, a ratio of a quantity of data transmission resources in the second BSS to a total quantity of resources is less than a second threshold, and the total quantity of resources is a sum of a quantity of data transmission resources in the first BSS and the quantity of data transmission resources in the second BSS.

In a possible implementation of the second aspect, the total quantity of resources is total bandwidth or a total quantity of slots, and the second threshold is $1/(S+1)$, where S is a quantity of BSSs overlapping with the second BSS.

According to a third aspect, an information transmission method is provided. The method may be performed by a first device or a second device, or may be performed by a chip used for a first device or a chip used for a second device. The method includes: determining an operating mode of a second frequency band in a first period, where the operating mode of the second frequency band includes one or more of enhanced distributed channel access EDCA operating mode and enhanced distributed channel access disable EDCA disable operating mode, the EDCA operating mode and the EDCA disable operating mode are in different periods of the second frequency band, and in the first period, the second frequency band is in the EDCA operating mode or the EDCA disable operating mode; and determining, based on the operating mode of the second frequency band in the first period, whether to bind a first frequency band and the second frequency band in the first period.

According to the information transmission method provided in the third aspect, when the device has data to be sent in the first period on the first frequency band and the second frequency band, whether to bind the first frequency band and the second frequency band in the first period needs to be determined. In this case, whether the second frequency band is in an EDCA disable period in the first period may be considered, and whether to aggregate (bind) the first frequency band and the second frequency band in the first period may be determined based on whether the second frequency band is in the EDCA disable period in the first period. This can avoid low transmission efficiency caused by the EDCA disable period during multi-band aggregation, and improve assurance of data transmission.

In a possible implementation of the third aspect, the determining, based on the operating mode of the second frequency band in the first period, whether to bind a first frequency band and the second frequency band in the first period includes: when the second frequency band is in the EDCA disable operating mode in the first period, binding the first frequency band and the second frequency band in the first period.

In a possible implementation of the third aspect, the determining, based on the operating mode of the second frequency band in the first period, whether to bind a first frequency band and the second frequency band in the first period includes: when the second frequency band is in the EDCA disable operating mode in the first period, skipping binding the first frequency band and the second frequency band in the first period.

In a possible implementation of the third aspect, the determining, based on the operating mode of the second frequency band in the first period, whether to bind a first frequency band and the second frequency band in the first period includes: determining, based on first indication information, whether to bind the first frequency band and the second frequency band in the first period, where the first indication information is used to indicate to bind or skip binding the first frequency band and the second frequency band in the first period, and the first period is an EDCA period or an EDCA disable period.

In a possible implementation of the third aspect, the operating mode of the second frequency band further includes a preconfigured operating mode for transmitting information, and the determining, based on the operating mode of the second frequency band in the first period, whether to bind a first frequency band and the second frequency band in the first period includes: when the second frequency band is in the preconfigured operating mode for transmitting information in the first period, binding the first frequency band and the second frequency band in the first period.

In a possible implementation of the third aspect, the determining, based on the operating mode of the second frequency band in the first period, whether to bind a first frequency band and the second frequency band in the first period includes: when a transmission opportunity exists on the second frequency band in the first period, binding the first frequency band and the second frequency band in the first period.

In a possible implementation of the third aspect, the first frequency band is a 5-GHz frequency band, and the second frequency band is a 6-GHz frequency band.

According to a fourth aspect, a communication apparatus is provided. The apparatus includes: a processing module, configured to determine TWT resource configuration information in a first BSS, where the communication apparatus is located in the first BSS; and a transceiver module, configured to send the TWT resource configuration information in the first BSS to a second device, where the second device is located in a second BSS, and the first BSS and the second BSS at least partially overlap.

In a possible implementation of the fourth aspect, the TWT resource configuration information in the first BSS includes one or more of the following fields: a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

In a possible implementation of the fourth aspect, the TWT resource configuration information in the first BSS includes the following fields: an element ID field, a length field, an information element ID extension field, a TWT coordination control field, a number of TWT period field and at least one per TWT period info field. The TWT coordination control field includes a TWT coordination enabled field and a number of overlapping BSS/access point AP field. The per TWT period info field includes a target wake time field, a TWT wake duration field, a TWT channel field, a spatial reuse allowed field, and an access class field.

In a possible implementation of the fourth aspect, the TWT resource configuration information in the first BSS further includes one or more of the following fields: a field indicating whether a TWT period is periodic, and a field indicating a TWT wake interval.

In a possible implementation of the fourth aspect, the TWT resource configuration information in the first BSS includes the following fields: an element ID field, a length field, an information element ID extension field, a TWT coordination control field, and a TWT coordination information field. The TWT coordination control field includes a TWT coordination enabled field, a number of overlapping BSS/AP field, a periodic field or an aperiodic field, and a reserved field. When the TWT coordination control field includes the periodic field, the TWT coordination information field includes a target wake time field, a TWT wake duration field, a TWT wake interval mantissa field, a TWT wake interval exponent field, a TWT channel field, a spatial reuse allowed field, and an access class field. When the TWT coordination control field includes the aperiodic field, the TWT coordination information field includes a number of TWT period field and at least one per TWT period info field. The per TWT period info field includes a target wake time field, a TWT wake duration field, a TWT channel field, a spatial reuse allowed field, and an access class field.

In a possible implementation of the fourth aspect, the transceiver module is specifically configured to send the TWT resource configuration information in the first BSS to the second device in a beacon (Beacon) frame.

In a possible implementation of the fourth aspect, the processing module is further configured to obtain TWT resource configuration information in the second BSS, and determine a data transmission resource in the first BSS based on the TWT resource configuration information in the second BSS.

In a possible implementation of the fourth aspect, a ratio of a quantity of data transmission resources in the first BSS to a total quantity of resources is less than a first threshold, and the total quantity of resources is a sum of the quantity of data transmission resources in the first BSS and a quantity of data transmission resources in the second BSS.

In a possible implementation of the fourth aspect, the total quantity of resources is total bandwidth or a total quantity of slots, and the first threshold is $1/(N+1)$, where N is the quantity of BSSs overlapping with the first BSS.

According to a fifth aspect, a communication apparatus is provided. The apparatus includes: a transceiver module, configured to receive TWT resource configuration information that is in a first BSS and that is sent by a first device, where the first device is located in the first BSS, the communication apparatus is located in a second BSS, and the first BSS and the second BSS at least partially overlap; and a processing module, configured to determine the TWT resource configuration information in the first BSS.

In a possible implementation of the fifth aspect, the TWT resource configuration information in the first BSS includes one or more of the following fields: a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

In a possible implementation of the fifth aspect, the TWT resource configuration information in the first BSS includes the following fields: an element ID field, a length field, an information element ID extension field, a TWT coordination control field, a number of TWT period field and at least one per TWT period info field. The TWT coordination control field includes a TWT coordination enabled field and a number of overlapping BSS/access point AP field. The per TWT period info field includes a target wake time field, a TWT wake duration field, a TWT channel field, a spatial reuse allowed field, and an access class field.

In a possible implementation of the fifth aspect, the TWT resource configuration information in the first BSS further includes one or more of the following fields: a field indicating whether a TWT period is periodic, and a field indicating a TWT wake interval.

In a possible implementation of the fifth aspect, the TWT resource configuration information in the first BSS includes the following fields: an element ID field, a length field, an information element ID extension field, a TWT coordination control field, and a TWT coordination information field. The TWT coordination control field includes a TWT coordination enabled field, a number of overlapping BSS/AP field, a periodic field or an aperiodic field, and a reserved field. When the TWT coordination control field includes the periodic field, the TWT coordination information field includes a target wake time field, a TWT wake duration field, a TWT wake interval mantissa field, a TWT wake interval exponent field, a TWT channel field, a spatial reuse allowed field, and an access class field. When the TWT coordination control field includes the aperiodic field, the TWT coordination information field includes a number of TWT period field and at least one per TWT period info field. The per TWT period info field includes a target wake time field, a TWT wake duration field, a TWT channel field, a spatial reuse allowed field, and an access class field.

In a possible implementation of the fifth aspect, the transceiver module is specifically configured to receive, in a beacon (Beacon) frame, the TWT resource configuration information in the first BSS.

In a possible implementation of the fifth aspect, the transceiver module is specifically configured to receive, on a primary channel of the first device, the TWT resource configuration information that is in the first BSS and that is sent by the first device; or receive, on a primary channel of the communication apparatus, the TWT resource configuration information that is in the first BSS and that is sent by the first device.

In a possible implementation of the fifth aspect, the processing module is further configured to determine a data transmission resource in the second BSS based on the TWT resource configuration information in the first BSS.

In a possible implementation of the fifth aspect, a ratio of a quantity of data transmission resources in the second BSS to a total quantity of resources is less than a second threshold, and the total quantity of resources is a sum of a quantity of data transmission resources in the first BSS and the quantity of data transmission resources in the second BSS.

In a possible implementation of the fifth aspect, the total quantity of resources is total bandwidth or a total quantity of slots, and the second threshold is $1/(S+1)$, where S is a quantity of BSSs overlapping with the second BSS.

According to a sixth aspect, a communication apparatus is provided. The apparatus includes: a processing module, configured to determine an operating mode of a second frequency band in a first period, where the operating mode of the second frequency band includes one or more of enhanced distributed channel access EDCA and enhanced distributed channel access disable EDCA disable, and the EDCA operating mode and the EDCA disable operating mode are in different periods of the second frequency band. The processing module is further configured to determine, based on the operating mode of the second frequency band, whether to bind a first frequency band and the second frequency band in the first period.

In a possible implementation of the sixth aspect, the processing module is specifically configured to: when the second frequency band is in the EDCA disable operating mode in the first period, bind the first frequency band and the second frequency band in the first period.

In a possible implementation of the sixth aspect, the processing module is specifically configured to: when the second frequency band is in the EDCA disable operating mode in the first period, skip binding the first frequency band and the second frequency band in the first period.

In a possible implementation of the sixth aspect, the apparatus further includes a transceiver module, configured to receive first indication information, where the first indication information is used to indicate to bind or skip binding the first frequency band and the second frequency band in the first period, and the first period is an EDCA period or an EDCA disable period.

The processing module is specifically configured to determine, based on the first indication information, whether to bind the first frequency band and the second frequency band in the first period.

In a possible implementation of the sixth aspect, the operating mode of the second frequency band further includes a preconfigured operating mode for transmitting information, and the processing module is specifically configured to: when the second frequency band is in the preconfigured operating mode for transmitting information in the first period, bind the first frequency band and the second frequency band in the first period.

In a possible implementation of the sixth aspect, the processing module is specifically configured to: when a transmission opportunity exists on the second frequency band in the first period, bind the first frequency band and the second frequency band in the first period.

In a possible implementation of the sixth aspect, the first frequency band is a 5-GHz frequency band, and the second frequency band is a 6-GHz frequency band.

According to a seventh aspect, a communication apparatus is provided. The apparatus includes at least one processor and a memory. The at least one processor is configured to perform the method according to any one of the first aspect, the third aspect, or the possible implementations of the first aspect or the third aspect.

According to an eighth aspect, a communication apparatus is provided. The apparatus includes at least one processor and a memory. The at least one processor is configured to perform the method according to any one of the second aspect, the third aspect, or the possible implementations of the second aspect or the third aspect.

According to a ninth aspect, a communication apparatus is provided. The apparatus includes at least one processor and an interface circuit. The at least one processor is configured to perform the method according to any one of the first aspect, the third aspect, or the possible implementations of the first aspect or the third aspect.

According to a tenth aspect, a communication apparatus is provided. The apparatus includes at least one processor and an interface circuit. The at least one processor is configured to perform the method according to any one of the second aspect, the third aspect, or the possible implementations of the second aspect or the third aspect.

According to an eleventh aspect, a terminal device is provided. The terminal device includes the communication apparatus provided in any one of the fourth aspect to the tenth aspect or the possible implementations of the fourth aspect to the tenth aspect.

According to a twelfth aspect, a network device is provided. The network device includes the communication apparatus provided in any one of the fourth aspect to the tenth aspect or the possible implementations of the fourth aspect to the tenth aspect.

According to a thirteenth aspect, a computer program product is provided. The computer program product includes a computer program. When the computer program is executed by a processor, the computer program is used to perform the method according to any one of the first aspect or the possible implementations of the first aspect, perform the method according to any one of the second aspect or the possible implementations of the second aspect, or perform the method according to any one of the third aspect or the possible implementations of the third aspect.

According to a fourteenth aspect, a computer-readable storage medium is provided. The computer-readable storage medium stores a computer program. When the computer program is executed, the computer program is used to perform the method according to any one of the first aspect or the possible implementations of the first aspect, perform the method according to any one of the second aspect or the possible implementations of the second aspect, or perform the method according to any one of the third aspect or the possible implementations of the third aspect.

BRIEF DESCRIPTION OF DRAWINGS

FIG. 9 is a schematic interaction diagram of another information transmission method according to an embodiment of this application;

FIG. 10 is a schematic diagram of a communication apparatus according to an embodiment of this application;

DESCRIPTION OF EMBODIMENTS

Figure 1:
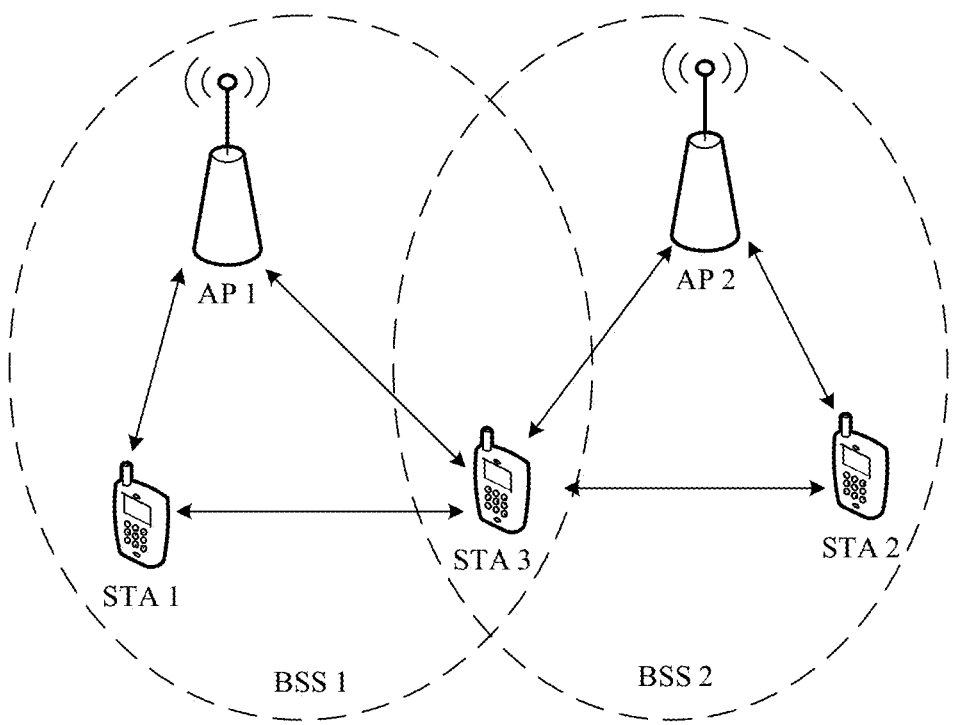
FIG. 1 is a schematic architectural diagram of a mobile communication system to which an embodiment of this application is applicable.

The following describes technical solutions of this application with reference to accompanying drawings.

The technical solutions of the embodiments of this application may be applied to various communication systems, such as a global system for mobile communications (Global System for Mobile Communications, GSM) system, a code division multiple access (Code Division Multiple Access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communication system, a 5th generation (5th Generation, 5G) system, or a new radio (new radio, NR) system.

The terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application. For ease of description, a station (station, STA) is used as an example for description in the following embodiments.

A first device in the embodiments of this application may be a base transceiver station (base transceiver station, BTS) in a global system for mobile communications (global system for mobile communications, GSM) or code division multiple access (Code Division Multiple Access, CDMA), or may be a NodeB (nodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario. Alternatively, the first device may be a relay station, an access point, a vehicle-mounted device, a wearable device, a network device in a 5G network, a network device in a future evolved PLMN network, an access point (AP), a personal basic service set control point (personal basic service set control point, PCP), or the like. This is not limited in the embodiments of this application. For ease of description, an AP is used as an example for description in the following embodiments.

A second device in the embodiments of this application may be a STA or an AP.

In the embodiments of this application, the station or the access point includes a hardware layer, an operating system layer running at the hardware layer, and an application layer running at the operating system layer. The hardware layer includes hardware such as a central processing unit (central processing unit, CPU), a memory management unit (memory management unit, MMU), and a memory (also referred to as a main memory). The operating system may include any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a STA, an AP, or a functional module that is in a STA or an AP and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (compact disc, CD), a digital versatile disc (digital versatile disc, DVD), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

First, some terms related to this application are briefly described.

A basic service set (basic service set, BSS) is used to describe a group of mobile devices that communicate with each other in an 802.11 wireless local area network (wireless local area network, WLAN). A BSS may or may not include an AP. There are two types of basic service sets. One is a basic service set in an infrastructure mode, and includes one AP and several mobile stations. The mobile station may be the foregoing STA. The other is a basic service set in a standalone mode, and includes several mobile stations. One of the mobile stations serves as a primary mobile station. Each basic service set has a unique identity that is referred to as a BSS identity (identity, ID). In the basic service set, all wireless devices are associated to one access point. The access point is connected to (or may not be connected to) another wired device, and controls and dominates a transmission process of all data in the entire BSS.

FIG. 1 is a schematic diagram of a network architecture of a wireless local area network to which an embodiment of this application is applicable. As shown in FIG. 1, the network architecture of the wireless local area network includes two BSSs, and the two BSSs partially overlap to obtain an overlapping basic service set (overlapping basic service set, OBSS). A BSS 1 includes an AP 1, a STA 1, and a STA 3, and a BSS 2 includes an AP 2, a STA 2, and the STA 3. The STA 3 is an overlapping part of the two BSSs. Each BSS includes one AP and a plurality of STAs. In one BSS, data may be transmitted between an AP and each STA, and data may be transmitted between a plurality of STAs. The overlapping STA 3 may communicate with the AP 1 and the AP 2. The AP 1 and the AP 2 may also communicate with each other, and STAs included in the two BSSs may also communicate with each other.

It should be understood that FIG. 1 is merely an example and should not constitute any limitation on a network architecture of a wireless local area network to which this application is applicable. For example, the network architecture may alternatively include more BSSs, each BSS may alternatively include more STAs, or some BSSs may alternatively not include an AP. An area in which a plurality of BSSs overlap may alternatively include more STAs, or the like. This is not limited herein in this embodiment of this application.

A WLAN usually operates on an unlicensed spectrum (unlicensed spectrum), and frequency bands are mainly classified into below 1 GHz, 2.4 GHz, 5 GHz, 6 GHz, and the like.

Mainstream WLAN standards such as 802.11a/b/g/n/ac/ax usually occupy the 2.4-GHz frequency band or the 5-GHz frequency band (strictly speaking, 4.9 GHz and 5 GHz). Recently, it has been decided in the 802.11ax standard that a 6-GHz spectrum that may be used as an unlicensed spectrum is also to be used as an operating spectrum of the standard.

Characteristics of air interface transmission vary with different frequency bands. For a low frequency, wireless transmission is characterized by comparatively slow signal attenuation and a good through-wall effect. However, a spectrum is comparatively limited, and a rate is sometimes limited by a spectrum size. For example, at 2.4 GHz, basic bandwidth for data packets in the 802.11b/g/n/ax standards is 20 MHz, and a maximum of 40 MHz is supported. In addition, channels partially overlap, thereby affecting continuous use of a plurality of channels. For this reason, it is decided that the 802.11a/ac are not to operate at 2.4 GHz. Compared with the comparatively congested 2.4-GHz frequency band, the 5-GHz and 6-GHz frequency bands have more abundant spectrum resources and are more suitable for high-bandwidth (the 802.11ac and the 802.11ax support a maximum of 160 MHz) and high-rate data transmission.

A target wake time (target wake time, TWT) was first proposed in the 802.11ah standard, and was originally intended to design an energy saving mechanism for an internet of things (the internet of things, IoT) device, especially for a light-traffic device (for example, a smart meter), to enable the IoT device to stay in a sleep state for as long as possible, so as to achieve very low power consumption. After a TWT agreement is established, a station (for example, a STA) does not need to receive a beacon (Beacon) frame, but wakes up based on a longer interval. The Beacon frame is a periodic frame used to wake up a station. The 802.11ax standard improves the beacon frame and introduces some rules specific to station behavior, thereby implementing management and control over channel access while saving energy.

TWT communication is mainly established in a unicast TWT manner or a broadcast TWT manner. Brief descriptions are provided below.

1. Unicast TWT

Figure 2:
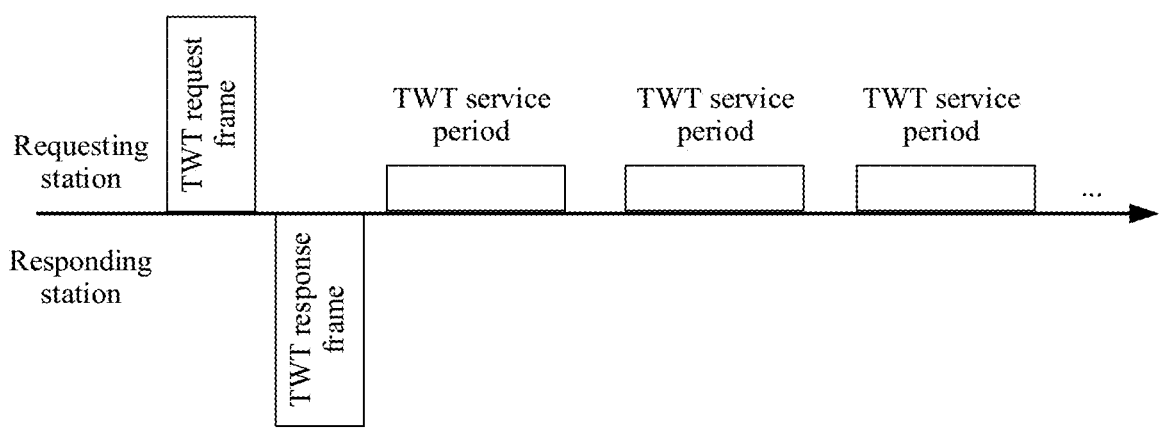
FIG. 2 is a schematic flowchart of a unicast TWT communication.

In the unicast TWT communication, a TWT requesting station (TWT requesting STA, "requesting station" for short) sends a TWT request message (a TWT request frame) to a TWT responding station (TWT responding STA, "responding station" for short), to request the responding station to set a time or an interval for waking the requesting station, and the responding station sends a TWT response message (a TWT response frame) to the requesting station after receiving the TWT request message. After interaction succeeds, a TWT agreement (which may be alternatively referred to as TWT communication) is established between the requesting station and the responding station. After the TWT agreement is reached, both the requesting station and the responding station should remain in an active state (a wake state) within an agreed-upon period, to send and receive data. A process of the unicast TWT communication is shown in FIG. 2. FIG. 2 is a schematic flowchart of the unicast TWT communication. The agreed-upon active period is referred to as a TWT service period (service period, SP), or may be referred to as a TWT service period, or may be referred to as a TWT period for short. Beyond the TWT service period, the requesting station and/or the responding station may fall asleep to save energy. Both the requesting station and the responding station may be STAs, or both the requesting station and the responding station may be APs. Usually, the requesting station is a STA, the responding station is an AP, and the STA sends a TWT agreement establishment request to the AP. Certainly, the AP may alternatively initiate a TWT agreement establishment request to the STA. As shown in FIG. 2, after the TWT agreement is established, each TWT agreement may include a plurality of periodic TWT service periods with the same duration. Certainly, the plurality of TWT service periods included in each TWT agreement may be alternatively aperiodic.

A start time and duration of the TWT service period, an interval between TWT service periods, and the like are determined by TWT parameters, and the TWT parameters are carried in the TWT request message and the TWT response message. After the TWT parameters are determined through TWT negotiation between the requesting station and the responding station, the requesting station and the responding station may determine a time of the TWT service period, so as to remain in an active state within a period of the corresponding TWT service period.

During the TWT negotiation, there are three manners of requesting TWT parameters by the requesting station: 1. requesting TWT parameters; 2. suggesting TWT parameters; and 3. demanding TWT parameters. Specifically, in the manner of requesting TWT parameters, the TWT request message sent by the requesting station does not include TWT parameters, and specific TWT parameters may be specified by the responding station. In the manner of suggesting TWT parameters, the requesting station provides suggested values of a group of TWT parameters, and the responding station may modify the TWT parameters based on a configuration of the responding station when returning the TWT response message. In the manner of demanding TWT parameters, the requesting station provides demanded values of a group of TWT parameters, and does not accept modifications, and the TWT response message of the responding station can only be agreeing to or rejecting the TWT parameters.

For the responding station, there are four responding manners during the TWT negotiation: 1. accepting TWT parameters; 2. alternating TWT parameters; and 3. dictating TWT parameters; and 4. rejecting a TWT parameters. In the manner of accepting TWT parameters, the responding station accepts TWT parameters requested by the requesting station, and the TWT agreement is therefore established. In the manner of alternating TWT parameters, the responding station does not accept TWT parameters provided by the requesting station, and provides a new group of TWT parameters in the TWT response message. In the manner of dictating TWT parameters, the responding station does not accept TWT parameters provided by the requesting station either, and provides a group of unique TWT parameters in the TWT response message, so that the requesting station can successfully establish the TWT agreement with the responding station only by using this group of TWT parameters. In the manner of rejecting TWT parameters, the responding station does not want to establish a TWT agreement with the requesting station, and the TWT response message includes an indication of rejecting establishment of a TWT agreement.

After the TWT agreement is established (that is, after the TWT communication is established), the requesting station (for example, the STA) and the responding station (for example, the AP) communicate with each other only within the TWT service period, and the STA disables a channel contention function within a period beyond the TWT service period. In this way, the AP may stagger TWT service periods for different STAs when establishing TWT agreements, thereby reducing a quantity of STAs contending for a channel at the same time, and implementing management and control over channel access of the stations. Further, during establishment of the TWT agreement, a parameter is "whether the AP is to send a trigger frame in a TWT service period". For example, if a value of the parameter is 1, the AP sends at least one trigger frame to the STA in each TWT service period, and the trigger frame is used to trigger the STA to send an uplink data frame to the AP. Because the STA knows in advance that the STA can perform uplink transmission based on a trigger frame sent by the AP, the STA may disable the channel contention function of the STA in the TWT service period, and only needs to wait for a trigger frame sent by the AP to perform uplink transmission. In this way, the STA may perform transmission based on scheduling of the AP, to finally reduce a collision probability and improve system performance.

2. Broadcast TWT

Different from the unicast TWT communication, the broadcast TWT communication provides a "batch management" mechanism. A responding station (for example, an AP) may establish a series of periodic TWT service periods with a plurality of requesting stations (for example, STAs). In the service periods, the plurality of STAs need to remain in an active state, to communicate with the AP.

Specifically, the AP may broadcast information about one or more TWTs in a beacon (Beacon) frame. Each broadcast TWT is jointly represented by a broadcast TWT identifier and a medium access control (Medium Access Control, MAC) address of the AP. After receiving the beacon frame, if a STA intends to join the broadcast TWT, the STA may send a broadcast TWT establishment request message to the AP, to join the broadcast TWT. During establishment of a TWT agreement, the STA needs to specify a broadcast TWT identifier to request to join a specific broadcast TWT. After joining the broadcast TWT, the STA may wake up based on a service period indicated by a TWT parameter, to communicate with the AP.

Similar to the unicast TWT, the broadcast TWT also specify an interval at which TWT service periods appear and duration of each TWT service period. In addition, the broadcast TWT parameters further include a broadcast TWT lifecycle. The broadcast TWT lifecycle is counted by using a beacon frame interval as a unit, and indicates duration of an established broadcast TWT.

During establishment of a broadcast TWT communication, the AP briefly describes resources to be allocated in TWT service periods of different STAs, for example, describes whether a trigger frame is to be sent in a TWT service period, and whether a resource used for random access is to be allocated by the sent trigger frame. In addition, the AP may further limit a type of a frame to be sent by a STA in a TWT service period, for example, set a limitation on whether only a control frame and a management frame can be sent, and whether an association request frame is allowed to be sent. The AP limits a type of a frame to be sent by a STA in a service period, so that different types of frames can be transmitted in different TWT service periods, thereby enhancing a resource scheduling capability of the AP.

The foregoing process of establishing TWT communication is specific to an AP and a STA in one BSS. However, when the foregoing process is used for an OBSS scenario, a problem may occur. For example, in the scenario shown in FIG. 1, the STA 3 may establish TWT communication with the AP 1 and the AP 2. The AP 1 and the AP 2 serve as two responding stations, and the STA 3 serves as a requesting station. Because the AP 1 does not know time-domain and/or frequency-domain information of a TWT parameter, such as a TWT service period, between the STA 3 and the AP 2, a TWT parameter configured by the AP 1 between the STA 3 and the AP 1 may collide with the TWT parameter between the STA 3 and the AP 2. For example, time domain and/or frequency domain information of a TWT service period between the STA 3 and the AP 1 collides with that between the STA 3 and the AP 2. In this case, data transmission between the STA 3 and the AP 1 may interfere with data transmission between the STA 3 and the AP 2, thereby seriously affecting efficiency and quality of data transmission. In addition, resources cannot be properly utilized or shared either, thereby affecting communication efficiency.

Based on the foregoing problems, this application provides an information transmission method, to share TWT resource configuration information in a BSS among a plurality of BSSs in an OBSS scenario, thereby avoiding collision during data transmission in different BSSs of the plurality of BSSs, improving quality and assurance of data transmission between devices in the plurality of BSSs, and improving efficiency of data transmission in the OBSS scenario.

Figure 3:
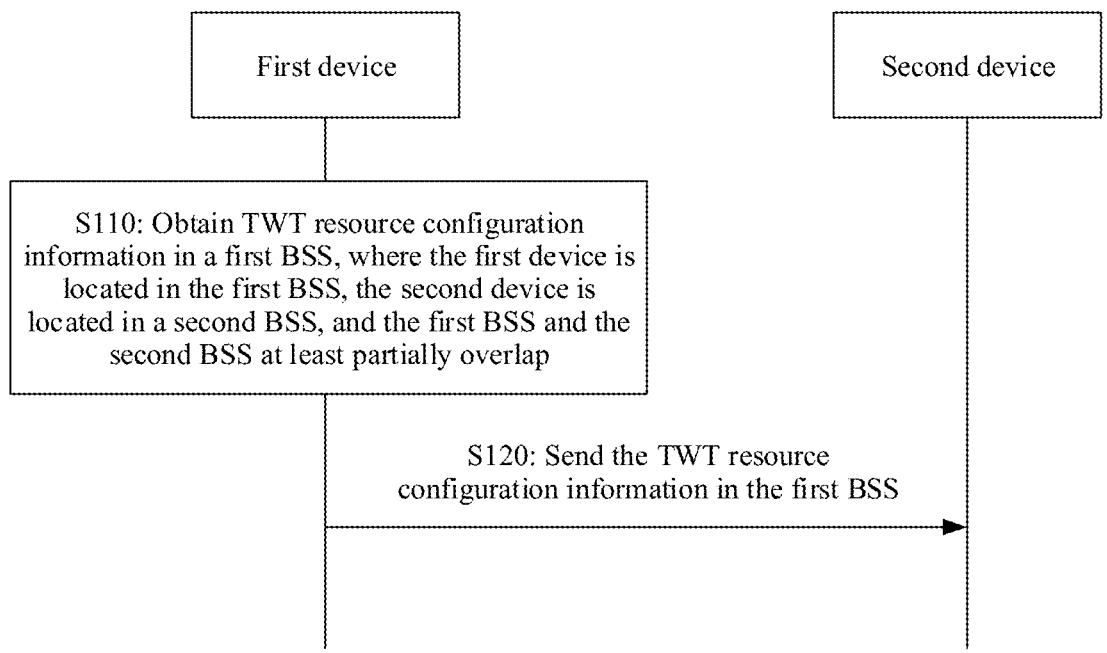
FIG. 3 is a schematic interaction diagram of an information transmission method according to an embodiment of this application.

The following describes in detail an information transmission method provided in this application with reference to FIG. 3. FIG. 3 is a schematic interaction diagram of an information transmission method 100 according to an embodiment of this application. The method 100 may be used in the scenario shown in FIG. 1, or certainly may be used in another communication scenario in which an OBSS exists. This is not limited herein in this embodiment of this application.

It should be understood that, in the embodiments of this application, methods in the embodiments are described by using examples in which the methods in the embodiments are performed by a first device and a second device. As an example rather than a limitation, the methods may be alternatively performed by a chip used for the first device and a chip used for the second device.

As shown in FIG. 3, the method 100 shown in FIG. 3 may include step S110 and step S120. The steps in the method 100 are described in detail below with reference to FIG. 3.

S110: A first device obtains TWT resource configuration information in a first BSS, where the first device is located in the first BSS.

S120: The first device sends the TWT resource configuration information in the first BSS to a second device, where the second device is located in a second BSS, and the first BSS and the second BSS at least partially overlap.

Specifically, the first BSS may be the BSS 1 shown in FIG. 1, and the first device may be the STA 3, the STA 1, or the AP 1. The second BSS may be the BSS 2 shown in FIG. 1, and the second device may be the STA 2 or the AP 2. Alternatively, the first device may be the STA 3, and the second device may be the AP 2. This is not limited in this embodiment of this application.

In step S110, the first device obtains (determines) the TWT resource configuration information in the first BSS. Specifically, the first device may collect statistics by using TWT information in the first BSS, to obtain the TWT resource configuration information in the first BSS. The TWT resource configuration information in the first BSS includes resource configurations information of all TWTs in the first BSS, and the like. For example, an example in which the first BSS is the BSS 1 shown in FIG. 1 is used for description. The TWT resource configuration information in the first BSS should include TWT resource configuration information between the AP 1 and the STA 3, TWT resource configuration information between the AP 1 and the STA 1, and TWT resource configuration information between the STA 1 and the STA 3. The TWT resource configuration information may include a start time of a TWT service period, duration of the TWT service period, an interval between TWT service periods, channel information of the TWT service period, and the like. The TWT resource configuration information may be determined based on a TWT parameter.

In step S120, the first device sends the TWT resource configuration information in the first BSS to the second device, where the second device is located in the second BSS, and the first BSS and the second BSS at least partially overlap.

It should be understood that, in this embodiment of this application, there may be a plurality of second BSSs, that is, there are a plurality of BSSs overlapping with the first BSS. When there are a plurality of second BSSs, there may also be a plurality of second devices, that is, the first device sends the TWT resource configuration information in the first BSS to the plurality of second devices. A quantity of second BSSs is not limited in this application.

In a possible implementation, the first device may be alternatively a STA in the second BSS. For example, the BSS 1 shown in FIG. 1 is used as an example for description. The first device may be alternatively the STA 2 in the BSS 2, and the STA 2 may obtain, through listening, TWT resource configuration information in the BSS 1, and notify the AP 2 of the TWT resource configuration information in the BSS 1.

It should be understood that the first device may first obtain all TWT parameters in the first BSS, then collect statistics on and process all the TWT parameters to obtain the TWT resource configuration information in the first BSS, and then send the TWT resource configuration information in the first BSS to the second device.

Optionally, the first device may first obtain all the TWT parameters in the first BSS, and directly send all the TWT parameters in the first BSS to the second device. That is, the first device may process none of the TWT parameters in the first BSS. In this case, the second device may process all the TWT parameters in the first BSS to obtain the TWT resource configuration information in the first BSS.

According to the information transmission method provided in this application, TWT resource configuration information in a BSS is shared among a plurality of BSSs in an OBSS scenario. Therefore, collision can be further avoided during data transmission in different BSSs in the OBSS scenario, thereby improving quality and assurance of data transmission between devices in the plurality of BSSs, and improving efficiency of data transmission in the OBSS scenario.

It should be understood that, if the second BSS also overlaps with another BSS, the second device may also send TWT resource configuration information in the second BSS to a device in the BSS overlapping with the second BSS. For example, in the example shown in FIG. 1, the second device may also send the TWT resource configuration information in the second BSS to the first device.

In an embodiment, the TWT resource configuration information in the first BSS ("TWT resource configuration information" for short) includes one or more of the following fields:

a field indicating whether a TWT is coordination-enabled in a plurality of BSSs, a field indicating a quantity of BSSs overlapping with the first BSS, a field indicating a quantity of TWT periods (TWT period), a field indicating a start time of a TWT period, a field indicating duration of a TWT period, a field indicating a channel in a TWT period, a field indicating whether spatial reuse is allowed in a TWT period, and a field indicating an access class in a TWT period.

In this application, the TWT resource configuration information in the first BSS may also be referred to as a TWT resource configuration information element (information element) in the first BSS.

Specifically, for the field indicating whether a TWT is coordination-enabled in a plurality of BSSs, for example, the field may be a TWT coordination enabled (TWT coordination enabled) field or a TWT coordination disabled (TWT coordination disabled) field. The TWT coordination enabled field is used to indicate that a current BSS (for example, the BSS 1) participates in TWT coordination in an OBSS scenario, to be specific, TWT resource configuration information may be shared in the OBSS scenario, and TWT resource configuration information of the current BSS is allowed to be shared in one or more BSSs (for example, the BSS 2) overlapping with the current BSS. The TWT coordination enabled field is used to indicate that a current BSS (for example, the BSS 1) does not participate in TWT coordination in an OBSS scenario, to be specific, TWT resource configuration information of the current BSS (for example, the BSS 1) is not allowed to be shared in one or more BSSs (for example, the BSS 2) overlapping with the current BSS.

For the field indicating a quantity of BSSs overlapping with the first BSS, for example, the field may be a field indicating a quantity of BSSs/APs overlapping with the first BSS (Number of overlapping BSS/AP), and the field is used to indicate a quantity of BSSs overlapping with the first BSS or a quantity of APs overlapping with the first BSS. Alternatively, the field may be a maximum quantity of BSSs/APs overlapping with the first BSS (Maximum number of overlapping BSS/AP), and the field is used to indicate a maximum quantity of overlapping (overlapping) BSSs/APs obtained by a device in the first BSS through listening. For example, in the example shown in FIG. 1, assuming that the first BSS is the BSS 1, if a value of the number of overlapping BSS/AP field includes the current BSS (that is, the BSS 1), the value of the number of overlapping BSS/AP field is 2; or if a value of the number of overlapping BSS/AP field does not include the current BSS (that is, the BSS 1), the value of the number of overlapping BSS/AP field is 1. A value of the maximum number of overlapping BSS/AP is 2.

For the field indicating a quantity of TWT periods (TWT period), the field is used to indicate a quantity of TWT periods (number of TWT period) (a "TWT period" may also be referred to as a "TWT service period"), that is, indicate a quantity of per TWT period info (per TWT period info) fields that appear in the TWT resource configuration information. The quantity of TWT periods includes all TWT periods in the first BSS. For example, an example in which the first BSS is the BSS 1 shown in FIG. 1 is used for description. A quantity of TWT periods in the first BSS should be a sum of a quantity of TWT periods between the AP 1 and the STA 3, a quantity of TWT periods between the AP 1 and the STA 1, and a quantity of TWT periods between the STA 1 and the STA 3.

For the field indicating a start time of a TWT period, the field is used to indicate a moment or a time at which each TWT period starts, for example, an index of a start symbol, or indexes of a start slot and a start symbol. For example, the field may be a target wake time (target wake time) field.

For the field indicating duration of a TWT period (TWT wake duration), the field is used to indicate duration for which each TWT period lasts, that is, duration of each TWT period. For example, the field may be a quantity of consecutive symbols.

For the field indicating a channel in a TWT period (TWT channel), the field is used to indicate information about a channel used in each TWT period. For example, the information about the channel may include information about a subcarrier used in each TWT period, or information about a frequency-domain resource in each TWT period. Specifically, the field may indicate, by using a bitmap (bitmap), which channels are used, and further indicate a used primary channel, or the like.

For the field indicating whether spatial reuse is allowed in a TWT period, the field is used to indicate whether spatial reuse (spatial reuse, SR) is allowed in a TWT period. For example, the field may be a spatial reuse allowed (spatial reuse allowed) field or a spatial reuse disallowed (spatial reuse disallowed) field.

For the field indicating an access class (access class, AC) in a TWT period, the field is used to indicate an access class or a primary access class (primary AC) in a current TWT period. The access class may also be understood as one or more services. Specifically, the first device may support one or more services, for example, a voice service and a video service. Indicating an access class in a TWT period may be indicating service information in the TWT period.

It should be understood that, in this embodiment of this application, the TWT resource configuration information may include a combination of any of the foregoing several fields, and may also include a field used to indicate TWT information in addition to the foregoing fields. This is not limited in this embodiment of this application.

Figure 4:
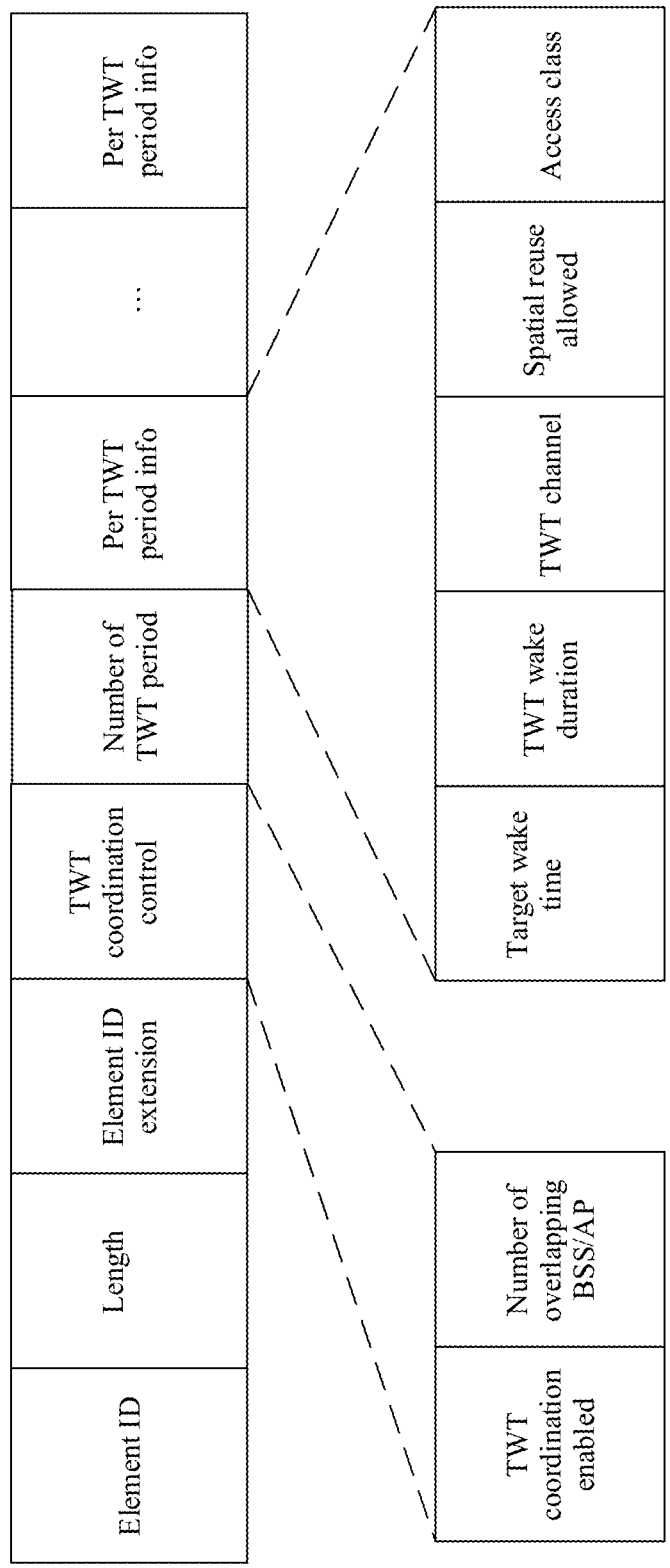
FIG. 4 is a schematic diagram of a format of TWT resource configuration information according to an embodiment of this application.

In a specific implementation, as shown in FIG. 4, the TWT resource configuration information includes the following fields:

an element ID field, a length field, an information element ID extension field, a TWT coordination control field, a number of TWT period field, and at least one per TWT period info field.

The TWT coordination control field includes a TWT coordination enabled field and a number of overlapping BSS/access point AP field.

The per TWT period info field includes a target wake time field, a TWT wake duration field, a TWT channel field, a spatial reuse allowed field, and an access class field.

Specifically, FIG. 4 is a schematic diagram of a format of TWT resource configuration information according to an embodiment of this application. As shown in FIG. 4, the TWT resource configuration information includes:

an element ID (element ID) field, a length (Length) field, an information element ID extension (element ID extension) field, a TWT coordination control (TWT coordination control) field, a number of TWT period (number of TWT period) field, and at least one per TWT period info (per TWT period info) field, where the per TWT period info (per TWT period info) field may also be referred to as a per TWT period info field.

The element ID (element ID) field is used to indicate an identity of a TWT resource configuration information element (information element). The length (Length) field is used to indicate a length of a TWT resource configuration information element. The TWT coordination control (TWT coordination control) field is used to determine whether to coordination-enable a TWT in a plurality of BSSs, that is, whether to allow the TWT resource configuration information in the first BSS to be shared in the plurality of BSSs.

The TWT coordination control (TWT coordination control) field includes a TWT coordination enabled (TWT coordination enabled) field and a number of overlapping BSS/access point AP (Number of overlapping BSS/AP) field.

The per TWT period info (per TWT period info) field includes a target wake time (target wake time) field, a TWT wake duration (TWT wake duration) field, a TWT channel (TWT channel) field, a spatial reuse allowed (spatial reuse allowed) field, and an access class (access class) field. The target wake time (target wake time) field is used to indicate a start time of a TWT period.

For specific meanings of the fields shown in FIG. 4, refer to the foregoing descriptions of the fields. For brevity, details are not described herein again.

It should be understood that, in this embodiment of this application, FIG. 4 is merely an example, and should not constitute any limitation on a specific format of TWT resource configuration information. For example, a time-domain location sequence (sequential order) of the foregoing fields included in the TWT resource configuration information is not limited. For example, as shown in FIG. 4, a time-domain location of the length (Length) field may be before that of the information element ID extension (element ID extension) field, or a time-domain location of the length (Length) field may be after that of the information element ID extension (element ID extension) field. A time-domain location of the TWT wake duration (TWT wake duration) field may be before that of the TWT channel (TWT channel) field, or a time-domain location of the TWT wake duration (TWT wake duration) field may be after that of the TWT channel (TWT channel) field. This is not limited in this embodiment of this application.

It should be further understood that, in this embodiment of this application, in addition to the fields shown in FIG. 4, the TWT resource configuration information may further include another field used to indicate TWT information. This is not limited in this embodiment of this application.

In another embodiment, based on the foregoing plurality of fields, the TWT resource configuration information further includes one or more of the following fields:

a field indicating whether a TWT period is periodic (periodic), and a field indicating a TWT wake interval (TWT wake interval).

Specifically, the field indicating whether a TWT period is periodic (periodic) is used to indicate whether a plurality of TWT periods are periodic. Formats of subsequent TWT period information may also vary based on whether the TWT periods are periodic.

The TWT wake interval (TWT wake interval) field is used to indicate a time interval between two adjacent TWT periods. Specifically, the time interval may be a time interval between start moments of two adjacent TWT periods, or may be a time interval between end moments of two adjacent TWT periods.

Figure 5:
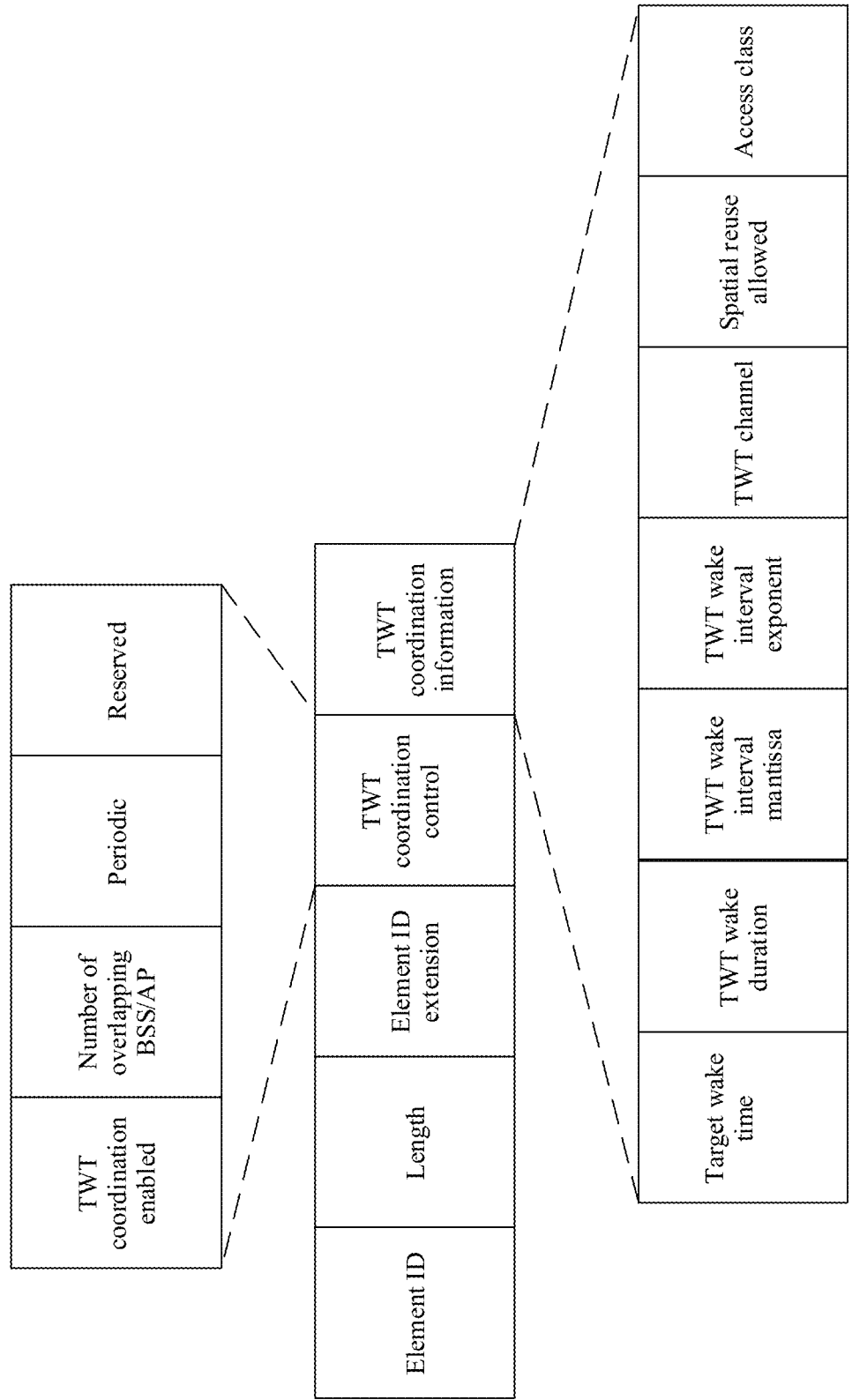
FIG. 5 is a schematic diagram of another format of TWT resource configuration information according to an embodiment of this application.

In a specific implementation, FIG. 5 is a schematic diagram of a format of TWT resource configuration information according to an embodiment of this application. As shown in FIG. 5, the TWT resource configuration information includes the following fields:

an element ID (element ID) field, a length (Length) field, an information element ID extension (element ID extension) field, a TWT coordination control (TWT coordination control) field, and a TWT coordination information (TWT coordination information) field.

The TWT coordination control (TWT coordination control) field includes a TWT coordination enabled (TWT coordination enabled) field, a number of overlapping BSS/AP (Number of overlapping BSS/AP) field, a periodic (periodic) field or an aperiodic (Aperiodic) field, and a reserved (reserved) field. The periodic (periodic) field is used to indicate that a plurality of TWT periods are periodic. The aperiodic (Aperiodic) field is used to indicate that a plurality of TWT periods are aperiodic.

As shown in FIG. 5, when the TWT coordination control (TWT coordination control) field includes the periodic (periodic) field, the TWT coordination information (TWT coordination information) field includes a target wake time (target wake time) field, a TWT wake duration (TWT wake duration) field, a TWT wake interval mantissa (TWT wake interval mantissa) field, a TWT wake interval exponent (TWT wake interval exponent) field, a TWT channel (TWT channel) field, a spatial reuse allowed (spatial reuse allowed) field, and an access class (access class) field.

The TWT wake interval mantissa (TWT wake interval mantissa) field and the TWT wake interval exponent (TWT wake interval exponent) field are used to calculate a TWT wake interval (TWT wake interval).

Specifically, K is used to indicate a value of the TWT wake interval mantissa, R is used to indicate a value of the TWT wake interval exponent, S is used to indicate a value of the TWT wake interval (TWT wake interval), and S, K, and R satisfy the following formula (1):

$$S=K*2^R \tag{1}$$

Figure 6:
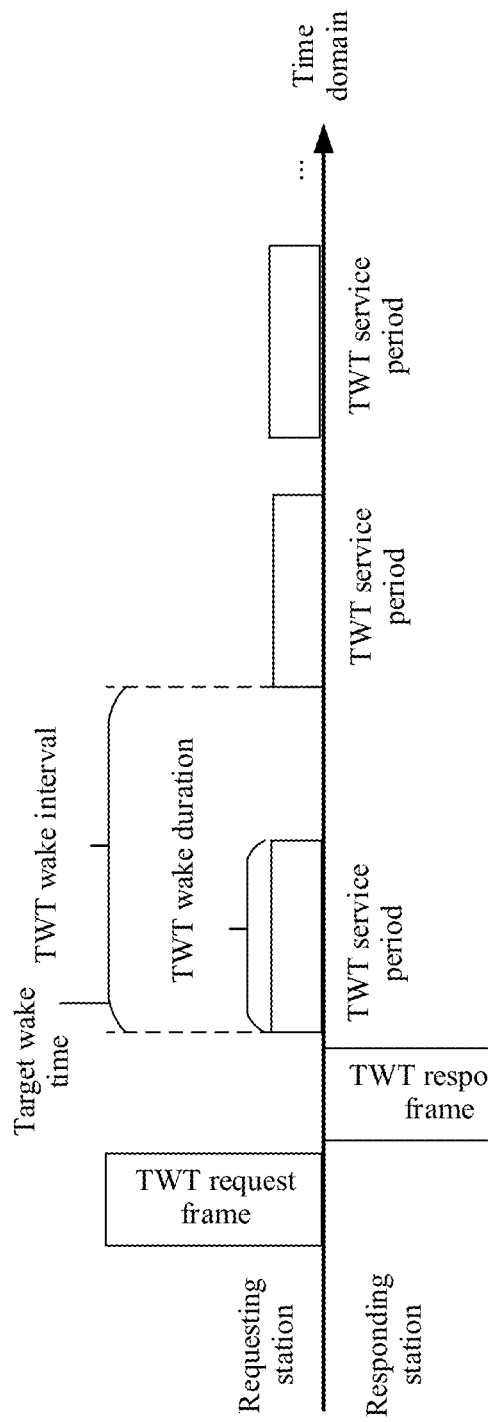
FIG. 6 is a diagram of a relationship between TWT wake duration, a target wake time, and a TWT wake interval.

The value of the TWT wake interval may be determined by using the formula (1). Because a plurality of TWT periods are periodic, values of TWT wake intervals between the plurality of TWT periods are the same. With reference to the target wake time (target wake time) field and the TWT wake duration (TWT wake duration) field, a time-domain location of each TWT period may be determined. FIG. 6 is a diagram of a relationship between TWT wake duration, a target wake time, and a TWT wake interval. As shown in FIG. 6, the target wake time indicates a start time of a TWT period, the TWT wake duration indicates duration of each TWT period, and the TWT wake interval indicates a time interval between start times (start moments) of two adjacent TWT periods. The TWT wake interval may be calculated by using the foregoing formula (1).

For specific meanings of the fields shown in FIG. 5, refer to the foregoing descriptions of the fields. For brevity, details are not described herein again.

Figure 7:
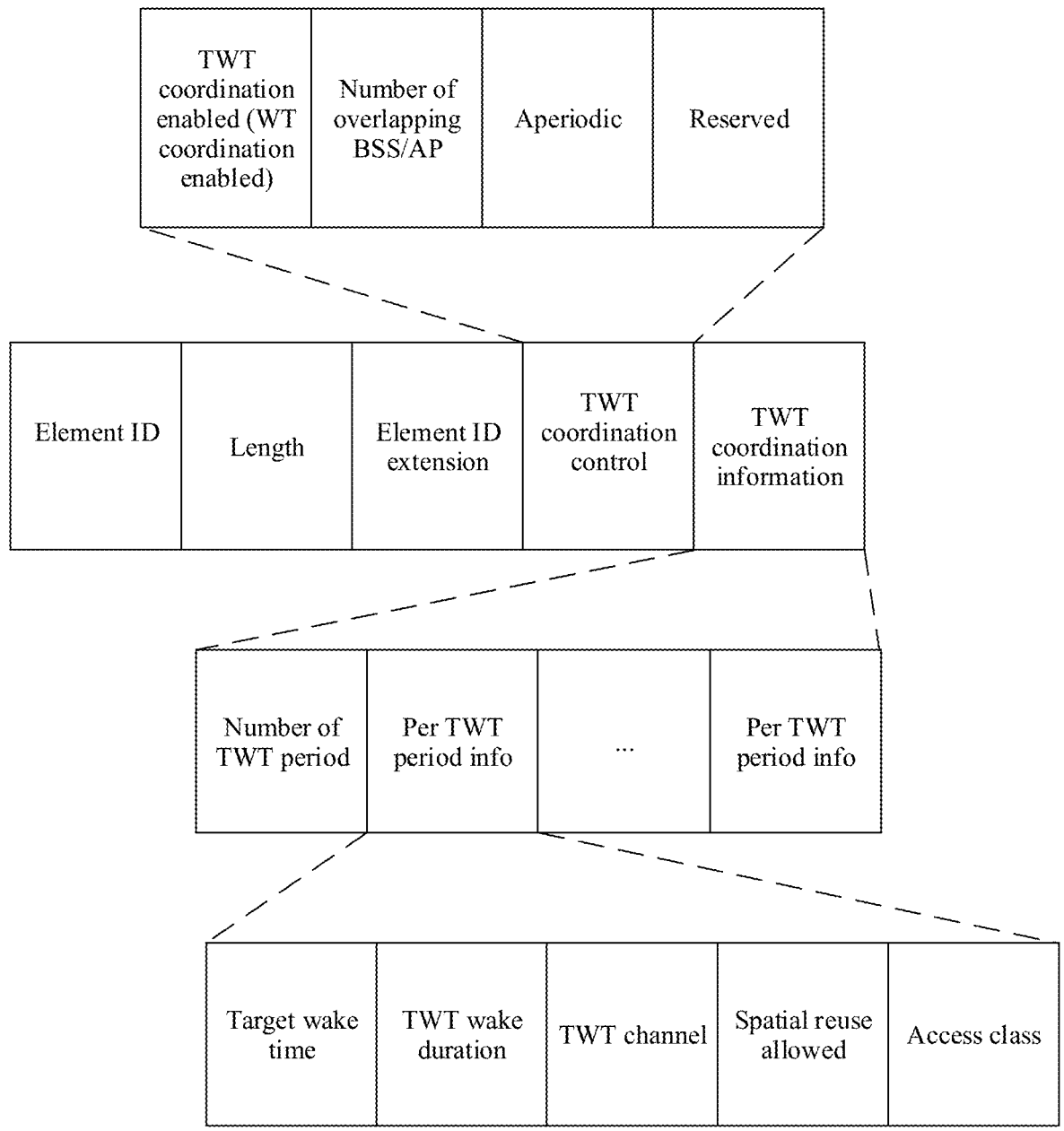
FIG. 7 is a schematic diagram of another format of TWT resource configuration information according to an embodiment of this application.

FIG. 7 is a schematic diagram of a format of TWT resource configuration information according to an embodiment of this application. As shown in FIG. 7, when the TWT coordination control (TWT coordination control) field includes the aperiodic (Aperiodic) field, that is, a TWT period is aperiodic, the TWT coordination information (TWT coordination information) field includes a number of TWT period (number of TWT period) field and one or more per TWT period info (per TWT period info) fields. The per TWT period info (per TWT period info) field includes a target wake time (target wake time) field, a TWT wake duration (TWT wake duration) field, a TWT channel (TWT channel) field, a spatial reuse allowed (spatial reuse allowed) field, and an access class (access class) field.

Other fields in the TWT resource configuration information shown in FIG. 7 are the same as those shown in FIG. 5. For specific descriptions, refer to the foregoing descriptions of FIG. 5. For brevity, details are not described herein again.

It should be understood that, in this embodiment of this application, FIG. 5 and FIG. 7 are merely examples, and should not constitute any limitation on a specific format of TWT resource configuration information. For example, a time-domain location sequence (sequential order) of the foregoing fields included in the TWT resource configuration information is not limited. For example, as shown in FIG. 5 or FIG. 7, a time-domain location of the TWT coordination enabled (TWT coordination enabled) field may be before that of the number of overlapping BSS/AP (Number of overlapping BSS/AP) field, or a time-domain location of the TWT coordination enabled (TWT coordination enabled) field may be after that of the number of overlapping BSS/AP (Number of overlapping BSS/AP) field. This is not limited herein in this embodiment of this application.

It should be further understood that, in this embodiment of this application, in addition to the fields shown in FIG. 5 and FIG. 7, the TWT resource configuration information may further include another field used to indicate TWT information. This is not limited herein in this embodiment of this application.

Optionally, in step S120, in a process in which the first device sends the TWT resource configuration information in the first BSS to the second device, the TWT resource configuration information in the first BSS may be carried in a beacon (Beacon) frame sent by the first device to the second device. Optionally, the TWT resource configuration information in the first BSS may be alternatively carried in a management frame, a control frame, a request frame, or the like sent by the first device to the second device. Alternatively, one frame may be separately configured for the TWT resource configuration information in the first BSS, to carry the TWT resource configuration information that is in the first BSS and that is sent by the first device to the second device, or the like. This is not limited herein in this embodiment of this application.

Optionally, when sending the TWT resource configuration information in the first BSS to the second device, the first device may send the TWT resource configuration information in the first BSS to the second device in a unicast manner. Alternatively, the first device may broadcast the TWT resource configuration information in the first BSS. In this case, a plurality of second devices (for example, a plurality of APs in a plurality of BSSs overlapping with the first BSS) may receive the TWT resource configuration information in the first BSS.

Optionally, when sending the TWT resource configuration information in the first BSS to the second device, the first device may send the TWT resource configuration information in the first BSS to the second device on a primary channel of the first device. Alternatively, the first device may send the TWT resource configuration information in the first BSS to the second device on a primary channel of the second device. Alternatively, the first device may send the TWT resource configuration information in the first BSS to the second device on a common channel. Alternatively, in a channel aggregation (channel aggregation)—based manner, the first device may send the TWT resource configuration information in the first BSS to the second device on an aggregate channel. Alternatively, the first device may send the TWT resource configuration information in the first BSS to the second device on any one of a plurality of available channels. This is not limited herein in this embodiment of this application.

As described above, because the first BSS and the second BSS also overlap, the second device may also send the TWT resource configuration information in the second BSS to a device in a BSS overlapping with the second BSS. For example, in the example shown in FIG. 1, the second device may also send the TWT resource configuration information in the second BSS to the first device. Therefore, based on the method steps shown in FIG. 3, as shown in FIG. 8, the method 100 may further include the following steps.

S130: The first device obtains the TWT resource configuration information in the second BSS.

S140: The first device determines a data transmission resource in the first BSS based on the TWT resource configuration information in the second BSS.

Figure 8:
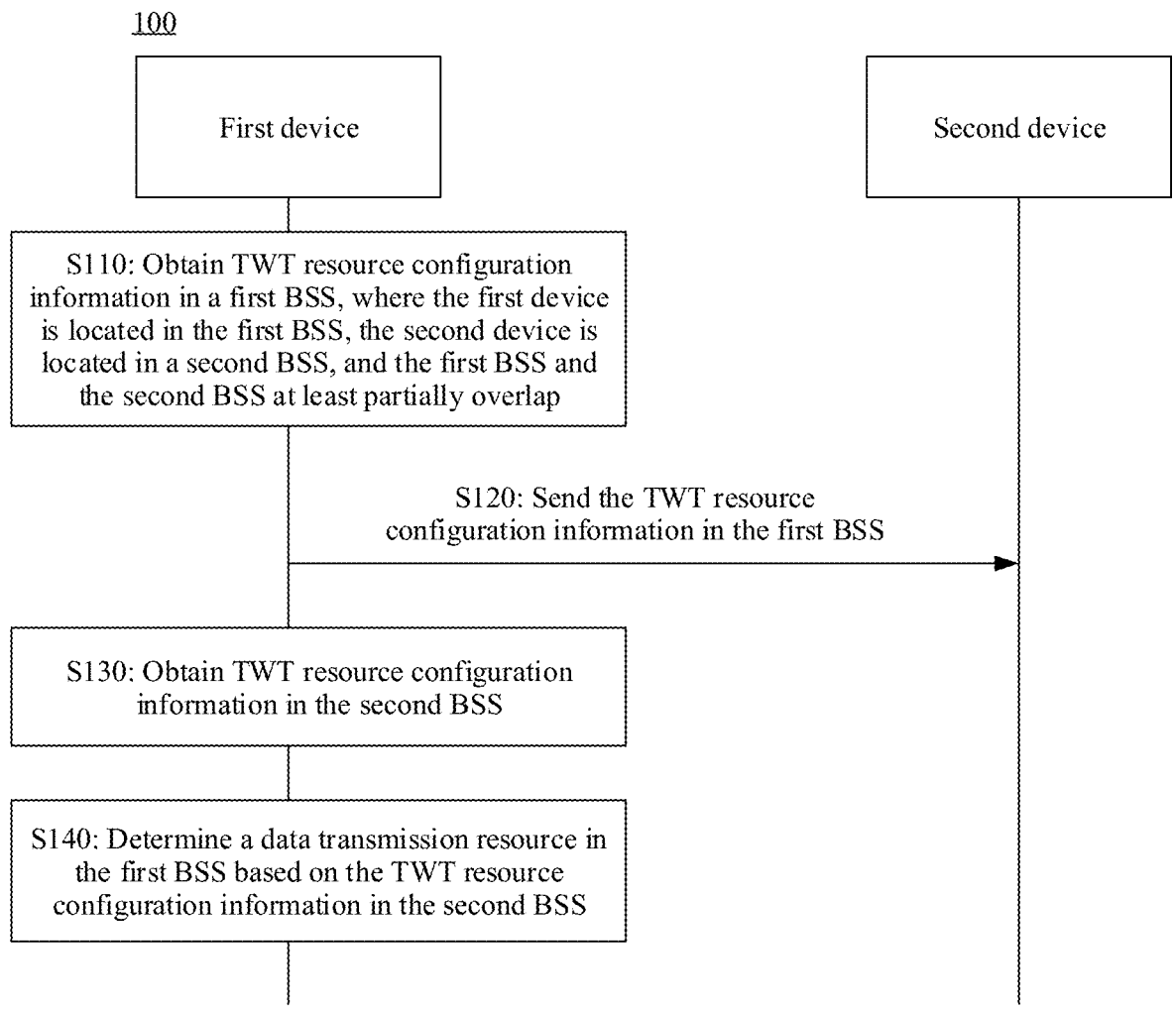
FIG. 8 is a schematic interaction diagram of another information transmission method according to an embodiment of this application.

Specifically, for descriptions of steps S110 and S120 shown in FIG. 8, refer to the descriptions of steps S110 and S120 in FIG. 3. For brevity, details are not described herein again.

In S130, the first device obtains the TWT resource configuration information in the second BSS. Specifically, a format of the TWT resource configuration information in the second BSS and fields included in the TWT resource configuration information in the second BSS are similar to the format of the TWT resource configuration information in the first BSS, the fields included in the TWT resource configuration information in the first BSS, and the like. For similar descriptions, refer to the foregoing descriptions related to the TWT resource configuration information in the first BSS. For brevity, details are not described herein again. A difference lies in that the TWT resource configuration information in the first BSS includes only TWT-related information in the first BSS, and the TWT resource configuration information in the second BSS includes only TWT-related information in the second BSS. For example, an example in which the second BSS is the BSS 2 shown in FIG. 1 is used for description. The TWT resource configuration information in the second BSS should include TWT resource configuration information between the AP 2 and the STA 2, TWT resource configuration information between the AP 2 and the STA 3, and TWT resource configuration information between the STA 2 and the STA 3. The TWT resource configuration information may include a start time of a TWT service period, duration of the TWT service period, an interval between TWT service periods, channel information of the TWT service period, and the like. The TWT resource configuration information may be determined based on a TWT parameter.

Optionally, the second device in the second BSS may send the TWT resource configuration information in the second BSS to the first device.

Specifically, a manner of sending the TWT resource configuration information in the second BSS by the second device to the first device, signaling for carrying the TWT resource configuration information in the second BSS, and a channel for sending the TWT resource configuration information in the second BSS are similar to the manner of sending the TWT resource configuration information in the first BSS by the first device to the second device, signaling for carrying the TWT resource configuration information in the first BSS, and a channel for sending the TWT resource configuration information in the first BSS in step S120. For example, the TWT resource configuration information in the second BSS may be carried in a beacon (Beacon) frame sent by the second device to the first device. For another example, when sending the TWT resource configuration information in the second BSS to the first device, the second device may send the TWT resource configuration information in the second BSS to the first device on the primary channel of the second device. For a specific sending manner and signaling for carrying the TWT resource configuration information in the second BSS, refer to the foregoing descriptions of step S120. For brevity, details are not described herein again.

In S140, after obtaining the TWT resource configuration information in the second BSS, the first device may determine the data transmission resource in the first BSS based on the TWT resource configuration information in the second BSS and with reference to the TWT resource configuration information in the first BSS. Specifically, because the first BSS and the second BSS overlap, transmission collision may occur when devices in the first BSS and the second BSS perform data transmission. For example, FIG. 1 is used as an example for description. A time-frequency resource used by the AP 1 to send data to the STA 3 may collide with a time-frequency resource used by the AP 2 to send data to the STA 3. For example, the data is transmitted by using a same time-domain resource and/or frequency-domain resource. The first device (for example, the AP 1) obtains the TWT resource configuration information in the second BSS (for example, the BSS 2), and determines the data transmission resource in the first BSS with reference to the TWT resource configuration information in the first BSS, for example, so that a time-domain resource and/or a frequency-domain resource for a TWT service period in the first BSS are/is different from a time-domain resource and/or a frequency-domain resource for a TWT service period in the second BSS, or the data transmission resource in the first BSS cannot exceed a threshold, where the threshold may be a proportion of the resource in total resources. The total resources herein are a sum of a quantity of data transmission resources in the first BSS and a quantity of data transmission resources in the second BSS. The total resources may have a specific boundary in time domain and/or frequency domain, to be specific, the total resources may be a block of resources that has a clear boundary in time domain and frequency domain. For example, the total resources may be a sum of resource quantities in a frequency-domain range within a period of time. The first device determines the data transmission resource in the first BSS based on the TWT resource configuration information in the second BSS and with reference to the TWT resource configuration information in the first BSS. This can avoid transmission collision that may occur when devices in the first BSS and the second BSS perform data transmission, avoid interference during data transmission, improve efficiency and assurance of data transmission, and improve resource utilization.

Optionally, in an embodiment, in a process in which the first device determines the data transmission resource in the first BSS based on the TWT resource configuration information in the second BSS and with reference to the TWT resource configuration information in the first BSS, a ratio of a quantity of determined data transmission resources in the first BSS to the total quantity of resources may be less than a first threshold, and the total quantity of resources is the sum of the quantity of data transmission resources in the first BSS and the quantity of data transmission resources in the second BSS.

For example, the total quantity of resources is total bandwidth or a total quantity of slots, and the first threshold may be $1/(N+1)$, where N is the quantity of BSSs overlapping with the first BSS. For example, in the example shown in FIG. 1, a value of N is 1, and the first threshold is 50%. To be specific, bandwidth or a quantity of slots used for data transmission in the first BSS cannot exceed 50% of the total bandwidth or the total quantity of slots.

For example, if the total quantity of slots is 20 slots (slot), the quantity of slots used for data transmission in the first BSS cannot exceed 10. The total quantity of slots may be equal to a quantity of slots in each channel (channel) in a beacon (beacon) frame interval (interval) multiplied by a quantity of channels (channel). For another example, if the total bandwidth is 100 GHz, the bandwidth used for data transmission in the first BSS cannot exceed 50 GHz. The total quantity of resources is irrelevant to a quantity of devices included in the first BSS and the second BSS, but may be related to a quantity of overlapping BSSs. To be specific, a total quantity of resources that are available within a period of time and that are in all overlapping BSSs (or non-overlapping BSSs) is the total quantity of resources. The total quantity of resources may include a resource in a spatial reuse allowed (spatial reuse allowed) period, or may not include a resource in a spatial reuse allowed (spatial reuse allowed) period. When the total quantity of resources includes a resource in a spatial reuse allowed (spatial reuse allowed) period, the resource in the spatial reuse allowed (spatial reuse allowed) period may be further counted in the total resources based on a specific scaling factor. For example, the resource in the spatial reuse allowed (spatial reuse allowed) period is multiplied by 0.5 and then counted in the total quantity of resources.

It should be understood that, in this embodiment of this application, the first threshold may be alternatively another value, and the total quantity of resources may alternatively include a total quantity of resources in another dimension. For example, the total quantity of resources may be a total transmission time in the first BSS and the second BSS, and the total transmission time herein may be a time within a beacon interval.

It should be further understood that, in this embodiment of this application, a central control node, such as an access controller (access controller, AC), may exist between the first BSS and the second BSS, to manage and control devices in the first BSS and the second BSS. Resource allocation of the total resources in the first BSS and the second BSS is also managed by the AC. For example, the AC may manage and control APs in the first BSS and the second BSS. The devices in the first BSS and the second BSS (for example, the APs in the first BSS and the second BSS) may negotiate with the AC on resources. For example, the devices in the first BSS and the second BSS may separately send a TWT reservation frame (reservation frame) to the AC, to request (request), suggest (suggest), or demand (demand) resources in the first BSS and the second BSS. The AC may separately return TWT confirmation frames (confirmation frame) to the devices in the first BSS and the second BSS. The confirmation frames may include accepting (accept), rejecting (reject), alternating (alternate), or dictating (dictate) resource requests, suggestions, demands, or the like of the devices in the first BSS or the second BSS, and the like.

In another possible implementation, the foregoing central control node may alternatively not exist between the first BSS and the second BSS, that is, the devices in the first BSS and the second BSS (for example, an AP in the first BSS and an AP in the second BSS) directly perform resource negotiation, allocation, and the like, to avoid transmission collision that may occur when the devices in the first BSS and the second BSS perform data transmission.

It should be further understood that the second device also obtains the TWT resource configuration information in the first BSS. Therefore, the second device may also determine a data transmission resource in the second BSS based on the TWT resource configuration information in the first BSS and with reference to the TWT resource configuration information in the second BSS, for example, so that a time-domain resource and/or a frequency-domain resource for a TWT service period in the second BSS are/is different from a time-domain resource and/or a frequency-domain resource for a TWT service period in the first BSS, or the data transmission resource in the second BSS cannot exceed a threshold, where the threshold may be a proportion of the resource in the total resources. The total resources herein are the sum of the quantity of data transmission resources in the second BSS and the quantity of data transmission resources in the first BSS. The second device determines the data transmission resource in the second BSS based on the TWT resource configuration information in the first BSS and with reference to the TWT resource configuration information in the second BSS. This can avoid transmission collision that may occur when devices in the first BSS and the second BSS perform data transmission, avoid interference during data transmission, improve efficiency and assurance of data transmission, and improve resource utilization.

Optionally, in an embodiment, in a process in which the second device determines the data transmission resource in the second BSS based on the TWT resource configuration information in the first BSS and with reference to the TWT resource configuration information in the second BSS, a ratio of a quantity of determined data transmission resources in the second BSS to the total quantity of resources may be less than a second threshold, and the total quantity of resources is the sum of the quantity of data transmission resources in the first BSS and the quantity of data transmission resources in the second BSS.

In a possible implementation, the total quantity of resources is total bandwidth or a total quantity of slots, and the second threshold is $1/(S+1)$, where S is a quantity of BSSs overlapping with the second BSS. For example, the total quantity of resources is total bandwidth or a total quantity of slots, and the second threshold may be $1/(S+1)$, where S is the quantity of BSSs overlapping with the second BSS. For example, in the example shown in FIG. 1, a value of N is 1, and the second threshold is 50%. To be specific, bandwidth or a quantity of slots used for data transmission in the second BSS cannot exceed 50% of the total bandwidth or the total quantity of slots.

It should be understood that a process in which the second device determines the data transmission resource in the second BSS based on the TWT resource configuration information in the first BSS and with reference to the TWT resource configuration information in the second BSS is similar to the process in which the first device determines the data transmission resource in the first BSS based on the TWT resource configuration information in the second BSS and with reference to the TWT resource configuration information in the first BSS. For specific descriptions, refer to the foregoing related descriptions of determining the data transmission resource in the first BSS by the first device. For brevity, details are not described herein again.

Currently, in a multi-band aggregation (multi-band aggregation) design, for example, two frequency bands are aggregated (bound), and the two frequency bands are referred to as a first frequency band and a second frequency band, in a process of aggregating the first frequency band and the second frequency band, determining needs to be performed to determine whether the first frequency band and the second frequency band meet a specific multi-band aggregation condition, and aggregation can be performed only when the multi-band aggregation condition is met. Specifically, the multi-band aggregation condition includes:

a countdown of a backoff timer (backoff timer) of a primary channel of the first frequency band is 0, and a countdown of a backoff timer of a primary channel of the second frequency band is not 0; and at least one channel of the second frequency band is idle for a period of time, where the period of time may be a point coordination function interframe space (point coordination function interframe space, PIFS), an arbitration interframe space (arbitration interframe space, AFIS), a distributed coordination function interframe space (distributed coordination function interframe space, DIFS), or the like.

That is, the two frequency bands can be aggregated under the following conditions:

the primary channel of the first frequency band is idle for a period of time (for example, idle for an AIFS/DIFS+backoff); and at least one channel of the second frequency band is idle for a period of time (for example, idle for a PIFS/AIFS).

In the foregoing conditions for aggregating (binding) the two frequency bands, whether the two frequency bands are idle is mainly considered. For example, the two frequency bands are bound only after the two frequency bands are both idle for a period of time. After the two frequency bands are bound, a data sending device (a STA or an AP) transmits data on a bound aggregate frequency band.

Currently, during aggregation (binding) of two frequency bands, an operating mode of one of the frequency bands is not considered. For example, operating modes may include enhanced distributed channel access disable (EDCA disable) and EDCA, and the EDCA disable and the EDCA are in different periods. A characteristic of an EDCA (which may also be referred to as EDCA enable) period lies in that a data sending device (a STA or an AP) performs channel listening and preempts a channel to send data, and a resource used for sending the data does not need to be obtained through scheduling or allocation (for example, the resource does not need to be scheduled by an AP). However, in an EDCA disable period, a resource used by a data sending device to send data needs to be obtained through scheduling or allocation (for example, the resource needs to be scheduled by an AP), and the device is not allowed to listen to and preempt a channel to send the data. There are a plurality of manners of indicating the EDCA disable period. For example, an indication to perform EDCA disable in a period of time (in a specific period) may be directly made. Alternatively, the EDCA disable is indicated in a manner in the 802.11ax standard, that is, an arbitration interframe space number (arbitration interframe space number, AIFSN)=0. Then, after being triggered (trigger), a device (for example, a STA) performs EDCA disable in a preset period.

Currently, during determining whether two frequency bands meet an aggregation condition, whether the frequency bands are in an EDCA disable period is not considered. For example, during binding of the first frequency band and the second frequency band, if the two frequency bands meet the foregoing two conditions, the two frequency bands may be bound; or if at least one of the two conditions is not met, the two frequency bands are not bound. If the first frequency band and the second frequency band are bound when the foregoing two conditions are met, if the first frequency band is in an EDCA period and the second frequency band is in an EDCA disable period, the binding violates a configuration of EDCA disable for the second frequency band, in other words, the binding in the period collides with an operating mode of the second frequency band. As a result, resources for data transmission on the second frequency band may be disordered, and data transmission errors may occur, thereby affecting quality of data transmission.

Based on the foregoing problems, this application further provides an information transmission method, to avoid low transmission efficiency caused by an EDCA disable period during multi-band aggregation, and improve assurance of data transmission.

The following describes in detail an information transmission method provided in this application with reference to FIG. 9. FIG. 9 is a schematic interaction diagram of an information transmission method 200 according to an embodiment of this application. As shown in FIG. 9, the method 200 shown in FIG. 9 may include step S210 and step S220. The method shown in FIG. 9 may be performed by the foregoing first device or second device. Certainly, the method 200 may be alternatively performed by a chip used for the first device or a chip used for the second device. This is not limited herein in this application.

As shown in FIG. 9, the method 200 includes the following steps.

S210: Determine an operating mode of a second frequency band in a first period, where the operating mode of the second frequency band includes one or more of EDCA and EDCA disable, and the EDCA operating mode and the EDCA disable operating mode are in different periods of the second frequency band. In the first period, the second frequency band is in the EDCA operating mode or the EDCA disable operating mode.

S220: Determine, based on the operating mode of the second frequency band in the first period, whether to bind a first frequency band and the second frequency band in the first period.

Specifically, according to the information transmission method provided in this application, when a device (for example, the foregoing first device or second device) has data to be sent in the first period on the first frequency band and the second frequency band, whether to bind the first frequency band and the second frequency band in the first period needs to be determined. In this case, whether the second frequency band is in an EDCA disable period in the first period may be considered, and the first period may be an EDCA disable period or an EDCA period based on whether the second frequency band is in the EDCA disable operating mode in the first period. Whether to aggregate (bind) the first frequency band and the second frequency band in the first period is determined. This can avoid low transmission efficiency caused by an EDCA disable period during multi-band aggregation, and improve assurance of data transmission.

It should be understood that, in the embodiments of this application, whether to bind the first frequency band and the second frequency band may be determined based on whether the second frequency band is in the EDCA disable period in the first period, and further with reference to the two determining conditions in a conventional technology. For example, on a basis that the two conditions in the conventional technology are met, that is, a primary channel of the first frequency band is idle for a period of time (for example, idle for an AIFS/DIFS+backoff), and at least one channel of the second frequency band is idle for a period of time (for example, idle for a PIFS/AIFS) in the first period, whether the second frequency band is in the EDCA disable operating mode in the first period may be further determined, that is, whether to bind the first frequency band and the second frequency band is determined by using the three conditions. If all the three conditions are met, the first frequency band and the second frequency band are bound in the first period; or if at least one of the three conditions is not met, the first frequency band and the second frequency band are not bound in the first period. Alternatively, in the embodiments of this application, only whether the second frequency band is in the EDCA disable operating mode in the first period may be determined, that is, whether to bind the first frequency band and the second frequency band in the first period is determined only based on the operating mode of the second frequency band in the first period. Determining is not performed by combining whether the second frequency band is in the EDCA disable operating mode in the first period and the two conditions in the conventional technology, but whether to bind the first frequency band and the second frequency band in the first period is determined only based on whether the second frequency band is in the EDCA disable operating mode in the first period. This is not limited herein in this embodiment of this application.

In this embodiment of this application, duration and a unit of the first period are not limited. For example, the first period may be counted in a unit of a slot (slot) or a symbol. For example, the duration of the first period may be a plurality of slots (slot) or symbols. A start location and/or an end location of the first period may also be counted in a unit of a slot or a symbol. Optionally, the duration of the first period may be alternatively an absolute time. For example, the duration of the first period may be 1 millisecond (ms) or other milliseconds. A start location and/or an end location of the first period may also be counted in a unit of an absolute time. In this embodiment of this application, duration and a unit of the first period are not limited.

In the first period, the second frequency band is in the EDCA operating mode or the EDCA disable operating mode. That is, the operating mode in the first period includes only the EDCA operating mode or the EDCA disable operating mode.

In a possible implementation, the determining, based on the operating mode of the second frequency band in the first period, whether to bind a first frequency band and the second frequency band in the first period in S220 includes:

when the second frequency band is in the EDCA disable operating mode in the first period, determining to skip binding the first frequency band and the second frequency band in the first period.

Specifically, if the second frequency band is in the EDCA disable operating mode in the first period, the first frequency band and the second frequency band are not bound in the first period. For example, if the first period includes a slot 1 to a slot 10 and a slot 12 to a slot 14, and the second frequency band is in the EDCA disable operating mode in the first period, in a period from the slot 1 to the slot 10 and a period from the slot 12 to the slot 14, the first frequency band and the second frequency band are not bound regardless of an operating mode of the first frequency band. A device (for example, the first device or the second device) that needs to send data separately transmits data on the first frequency band and the second frequency band. In another period, for example, if the second frequency band is in an EDCA enable period, the first frequency band and the second frequency band may be bound, or the first frequency band and the second frequency band may not be bound. This is not limited in this embodiment of this application.

In another possible implementation, the determining, based on the operating mode of the second frequency band in the first period, whether to bind a first frequency band and the second frequency band in the first period in S220 includes:

when the second frequency band is in the EDCA disable operating mode in the first period, determining to bind the first frequency band and the second frequency band in the first period.

Specifically, if the second frequency band is in the EDCA disable operating mode in the first period, the first frequency band and the second frequency band may be bound in the first period. For example, if the first period includes a slot 1 to a slot 10, and the second frequency band is in the EDCA operating mode in the first period, the first frequency band and the second frequency band may be bound in the first period. In another period, for example, a period in which the second frequency band is in the EDCA enable operating mode, the first frequency band and the second frequency band may be bound, and a device transmits data on an aggregate frequency band obtained by binding the first frequency band and the second frequency band. Alternatively, in a period in which the second frequency band is in the EDCA enable operating mode, the first frequency band and the second frequency band are not bound, and a device separately transmits data on the first frequency band and the second frequency band.

In another possible implementation, the determining, based on the operating mode of the second frequency band in the first period, whether to bind a first frequency band and the second frequency band in the first period in S220 includes:

determining, based on first indication information, whether to bind the first frequency band and the second frequency band, where the first indication information is used to indicate to bind or skip binding the first frequency band and the second frequency band in the first period, and the first period is an EDCA period or an EDCA disable period.

Specifically, an AP may predetermine whether to bind the first frequency band and the second frequency band in a plurality of periods, where the plurality of periods may include an EDCA disable period and/or an EDCA enable period; and send, to a STA, the first indication information indicating whether to bind the first frequency band and the second frequency band in the plurality of periods. Each of the plurality of periods may be the first period. For example, the first indication information may indicate, for each EDCA disable period or EDCA enable period by using 1 bit, whether binding of many frequency bands is allowed or not allowed in the period. The first indication information may be placed in one information element (information element, IE) with EDCA disable field, or may be separately indicated by one IE or one field (field). After receiving the first indication information, the STA may determine, based on the first indication information and information about different periods, whether to bind the first frequency band and the second frequency band.

Alternatively, an agreement may predefine whether to bind the first frequency band and the second frequency band in a plurality of periods, where the plurality of periods include an EDCA disable period and/or an EDCA enable period; and configure, for the AP and the STA, information about whether multi-band binding needs to be performed in the plurality of periods. When the AP or the STA needs to send data, the AP or the STA may determine, based on the configured information, whether to bind the first frequency band and the second frequency band.

In another possible implementation, the operating mode of the second frequency band further includes a preconfigured operating mode of a period for transmitting information, and the determining, based on the operating mode of the second frequency band in the first period, whether to bind a first frequency band and the second frequency band in the first period in S220 includes:

when the second frequency band is in the preconfigured operating mode for transmitting information in the first period, binding the first frequency band and the second frequency band in the first period.

Specifically, the operating mode of the second frequency band may further include a preconfigured period for transmitting information (which may also be referred to as a scheduled (schedule) period for transmitting data). For example, the preconfigured period for transmitting information may include a TWT service period. The preconfigured period for transmitting information may partially, completely, or not overlap with the EDCA disable period.

Certainly, alternatively, the preconfigured period for transmitting information may partially, completely, or not overlap with the EDCA enable period. The preconfigured period for transmitting information may be a period that is used for transmitting information and that is obtained through pre-negotiation between the AP and the STA, or may be a period that is used for transmitting information and that is scheduled by the AP for the STA. When the second frequency band is in the preconfigured operating mode for transmitting information in the first period, it is determined to bind the first frequency band and the second frequency band.

In another possible implementation, the determining, based on the operating mode of the second frequency band in the first period, whether to bind a first frequency band and the second frequency band in the first period in S220 includes:

when a transmission opportunity exists on the second frequency band in the first period, binding the first frequency band and the second frequency band in the first period.

Specifically, a period in which a transmission opportunity exists on the second frequency band may partially, completely, or not overlap with the preconfigured period for transmitting information. Alternatively, a period in which a transmission opportunity exists on the second frequency band may partially, completely, or not overlap with the EDCA disable period or the EDCA enable period. The period in which a transmission opportunity exists on the second frequency band may include a TWT service period, or the like. When a transmission opportunity exists on the second frequency band in the first period, the first frequency band and the second frequency band are bound in the first period.

In another possible implementation, a device (an AP or a STA) that needs to send data is a member of a pre-allocated group. For example, the pre-allocated group may be a device group that may have a transmission opportunity on the second frequency band in some periods. Alternatively, the pre-allocated group may be a device group that has a preconfigured period for transmitting information on the second frequency band. This is not limited herein in this embodiment of this application. If the device (the AP or the STA) that needs to send data is a member of the pre-allocated group, the first frequency band and the second frequency band are bound. The device that needs to send data sends data on an aggregate frequency band obtained by binding the first frequency band and the second frequency band.

Optionally, in the foregoing embodiments, the first frequency band may be a 5-GHz frequency band, and the second frequency band may be a 6-GHz frequency band.

It should be understood that, in this embodiment of this application, whether to bind the first frequency band and the second frequency band in the first period is determined by using the foregoing several conditions, and the operating mode of the second frequency band in the first period mainly needs to be considered. Whether to bind the first frequency band and the second frequency band is determined based on the operating mode of the second frequency band in the first period, without considering the operating mode of the first frequency band in the first period. For the first frequency band, the operating mode of the first frequency band in the first period may be EDCA enable, EDCA disable, another operating mode, or the like. This is not limited in this embodiment of this application.

According to the information transmission method provided in this application, whether to bind the first frequency band and the second frequency band in the EDCA disable period is specified. This resolves a problem that transmission efficiency may be low when a plurality of frequency bands are bound in an EDCA disable period, and improves assurance of data transmission.

It should be understood that, in the embodiments of this application, "first", "second", and the like are merely intended to indicate that a plurality of objects are different. For example, the first device and the second device are merely intended to indicate different devices, without any impact on the devices. "First", "second", and the like should not be construed as any limitation on the embodiments of this application.

It should be understood that, the foregoing examples are merely intended to help a person skilled in the art better understand the embodiments of the present invention, instead of limiting the scope of the embodiments of the present invention. It is clearly that a person skilled in the art may make various equivalent modifications or changes based on the foregoing examples. For example, some steps in the method 100 and the method 200 may not be required, or some steps may be added. Alternatively, any two or more of the foregoing embodiments are combined. A modified, changed, or combined solution also falls within the scope of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be understood that sequence numbers of the processes do not mean execution sequences in the foregoing embodiments. The execution sequences of the processes should be determined according to functions and internal logic of the processes, and should not be construed as any limitation on the implementation processes of the embodiments of this application.

It should be further understood that, in the embodiments of this application, "presetting" and "predefining" may be implemented by prestoring corresponding code or a corresponding table on a device (for example, including a terminal device and a network device), or in another manner that may be used to indicate related information. A specific implementation thereof is not limited in this application.

It should be further understood that the manners, cases, categories, and embodiment division in the embodiments of this application are merely intended for ease of description, and should not constitute any particular limitation. The manners, categories, cases, and features in the embodiments may be combined without contradiction.

It should be further understood that, in the embodiments of this application, unless there is a particular description or a logical conflict, terms and/or descriptions in different embodiments are consistent and may be mutually referenced. Technical features in different embodiments may be combined based on their internal logical relationship to form a new embodiment.

The foregoing describes in detail the information transmission methods in the embodiments of this application with reference to FIG. 1 to FIG. 9. The following describes a communication apparatus in the embodiments of this application with reference to FIG. 10 to FIG. 14. It should be understood that the communication apparatus in FIG. 10 to FIG. 14 is capable of performing the steps of the information transmission methods in the embodiments of this application.

FIG. 10 is a schematic block diagram of a communication apparatus 300 according to an embodiment of this application. The apparatus 300 may correspond to the first device described in the embodiments of the foregoing methods, or may be a chip or a component used for the first device. In addition, modules or units in the apparatus 300 are separately configured to perform the actions or the processing processes performed by the first device in the method 100 and the foregoing embodiments. As shown in FIG. 10, the communication apparatus 300 may include a processing module 310 and a transceiver module 320.

The processing module 310 is configured to determine TWT resource configuration information in a first BSS, where the communication apparatus is located in the first BSS.

The transceiver module 320 is configured to send the TWT resource configuration information in the first BSS to a second device, where the second device is located in a second BSS, and the first BSS and the second BSS at least partially overlap.

It should be understood that, for a specific process in which the modules in the apparatus 300 perform the foregoing corresponding steps, reference may be made to the foregoing descriptions related to the first device in the method embodiments with reference to FIG. 3 to FIG. 8. For brevity, details are not described herein again.

Optionally, the transceiver module 320 may include a receiving module (unit) and a sending module (unit), configured to perform the steps of receiving information and sending information by the first device in the foregoing method embodiments and the embodiments shown in FIG. 3 and FIG. 8. Optionally, the communication apparatus 300 may further include a storage module 330, configured to store instructions executed by the transceiver module 320 and the processing module 310. The processing module 310, the transceiver module 320, and the storage module 330 are communicatively connected. The storage module 330 stores instructions, the processing module 310 is configured to execute the instructions stored in the storage module 330, and the transceiver module 320 is configured to specifically send/receive a signal under driving by the processing module 310.

Figure 11:
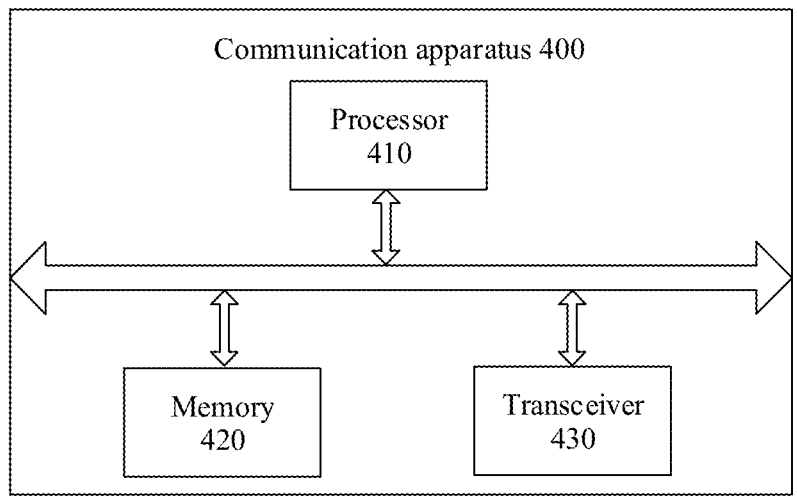
FIG. 11 is a schematic diagram of another communication apparatus according to an embodiment of this application.

It should be understood that the transceiver module 320 may be implemented by a transceiver, the processing module 310 may be implemented by a processor, and the storage module 330 may be implemented by a memory. As shown in FIG. 11, a communication apparatus 400 may include a processor 410, a memory 420, and a transceiver 430.

The communication apparatus 300 shown in FIG. 10 or the communication apparatus 400 shown in FIG. 11 is capable of implementing the steps performed by the first device in the foregoing method embodiments and the embodiments shown in FIG. 3 and FIG. 8. For similar descriptions, refer to the descriptions in the foregoing corresponding methods. To avoid repetition, details are not described herein again.

It should be further understood that the communication apparatus 300 shown in FIG. 10 or the communication apparatus 400 shown in FIG. 11 may be a terminal device or a network device.

Figure 12:
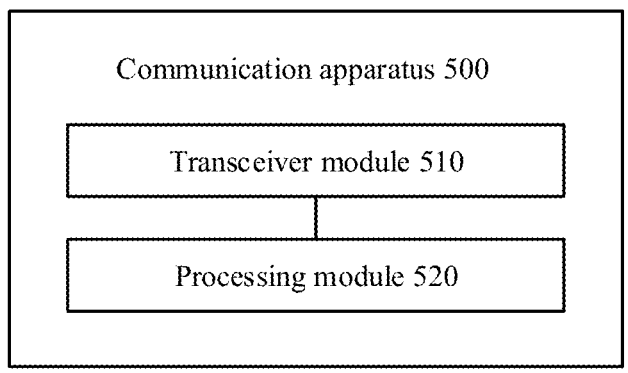
FIG. 12 is a schematic diagram of a communication apparatus according to an embodiment of this application.

FIG. 12 is a schematic block diagram of a communication apparatus 500 according to an embodiment of this application. The apparatus 500 may correspond to the second device described in the embodiments of the foregoing methods, or may be a chip or a component used for the second device. In addition, modules or units in the apparatus 500 are separately configured to perform the actions or the processing processes performed by the second device in the method 100 and the foregoing embodiments. As shown in FIG. 12, the communication apparatus 500 may include:

a transceiver module 510 and a processing module 520.

The transceiver module 510 is configured to receive TWT resource configuration information that is in a first BSS and that is sent by a first device, where the first device is located in the first BSS, the communication apparatus 500 is located in a second BSS, and the first BSS and the second BSS at least partially overlap.

The processing module 520 is configured to determine the TWT resource configuration information in the first BSS.

It should be understood that, for a specific process in which the modules in the apparatus 500 perform the foregoing corresponding steps, reference may be made to the foregoing descriptions related to the second device in the method embodiments with reference to FIG. 3 to FIG. 8. For brevity, details are not described herein again.

Optionally, the transceiver module 510 may include a receiving module (unit) and a sending module (unit), configured to perform the steps of receiving information and sending information by the second device in the foregoing method embodiments and the embodiments shown in FIG. 3 and FIG. 8. Optionally, the communication apparatus 500 may further include a storage module 530, configured to store instructions executed by the transceiver module 510 and the processing module 520. The processing module 520, the transceiver module 510, and the storage module 530 are communicatively connected. The storage module 530 stores instructions, the processing module 520 is configured to execute the instructions stored in the storage module 530, and the transceiver module 510 is configured to specifically send/receive a signal under driving by the processing module 520.

Figure 13:
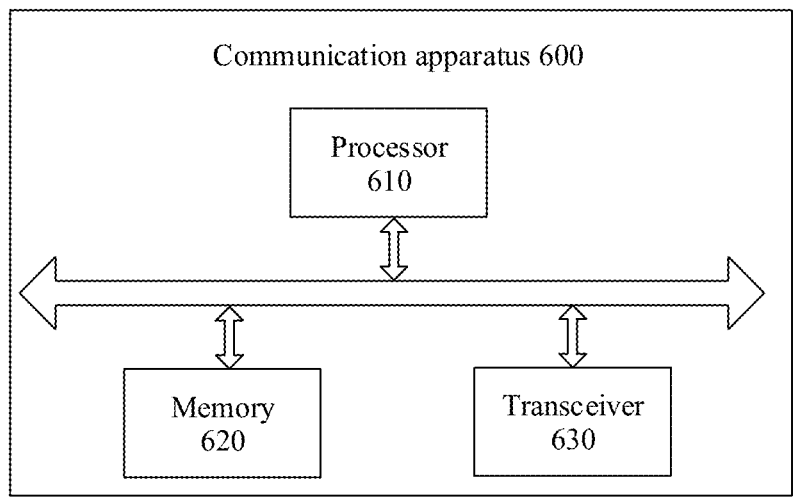
FIG. 13 is a schematic diagram of another communication apparatus according to an embodiment of this application.

It should be understood that the transceiver module 510 may be implemented by a transceiver, the processing module 520 may be implemented by a processor, and the storage module 530 may be implemented by a memory. As shown in FIG. 13, a communication apparatus 600 may include a processor 610, a memory 620, and a transceiver 630.

The communication apparatus 500 shown in FIG. 12 or the communication apparatus 600 shown in FIG. 13 is capable of implementing the steps performed by the second device in the foregoing method embodiments and the embodiments shown in FIG. 3 and FIG. 8. For similar descriptions, refer to the descriptions in the foregoing corresponding methods. To avoid repetition, details are not described herein again.

It should be further understood that the communication apparatus 500 shown in FIG. 12 or the communication apparatus 600 shown in FIG. 13 may be a terminal device or a network device.

Figure 14:
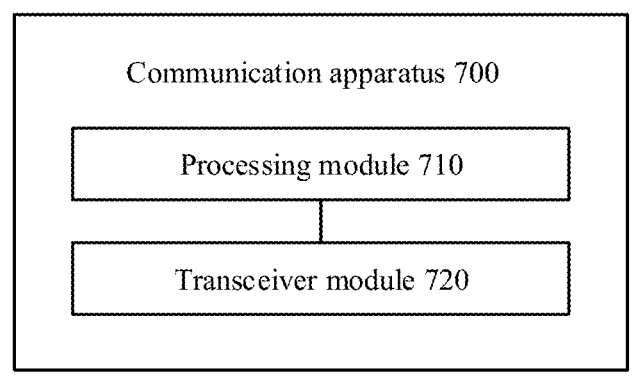
FIG. 14 is a schematic diagram of a communication apparatus according to an embodiment of this application.

FIG. 14 is a schematic block diagram of a communication apparatus 700 according to an embodiment of this application. The apparatus 700 may correspond to the first device described in the embodiments of the foregoing methods, or may be a chip or a component used for the first device; or may correspond to the second device described in the embodiments of the foregoing methods, or may be a chip or a component used for the second device.

In addition, modules or units in the apparatus 700 are separately configured to perform the actions or the processing processes performed in the method 200 and the foregoing embodiments. As shown in FIG. 14, the communication apparatus 700 may include:

a processing module 710, configured to determine an operating mode of a second frequency band in a first period, where the operating mode of the second frequency band includes one or more of enhanced distributed channel access EDCA and enhanced distributed channel access disable EDCA disable, the EDCA operating mode and the EDCA disable operating mode are in different periods of the second frequency band, and the processing module 710 is further configured to determine, based on the operating mode of the second frequency band, whether to bind a first frequency band and the second frequency band in the first period. Optionally, the apparatus 700 may further include a transceiver module 720, configured to specifically send/receive a signal or information, or the like.

It should be understood that, for a specific process in which the modules in the apparatus 700 perform the foregoing corresponding steps, reference may be made to the foregoing descriptions related to the method embodiment shown in FIG. 9 and the embodiments of the method 200. For brevity, details are not described herein again.

Optionally, the transceiver module 720 may include a receiving module (unit) and a sending module (unit), configured to perform the steps of receiving information and sending information in the foregoing embodiments of the method 200 and the embodiment shown in FIG. 9. Optionally, the communication apparatus 700 may further include a storage module 730, configured to store instructions executed by the transceiver module 720 and the processing module 710. The processing module 710, the transceiver module 720, and the storage module 730 are communicatively connected. The storage module 730 stores instructions, the processing module 710 is configured to execute the instructions stored in the storage module 730, and the transceiver module 720 is configured to specifically send/receive a signal under driving by the processing module 710.

Figure 15:
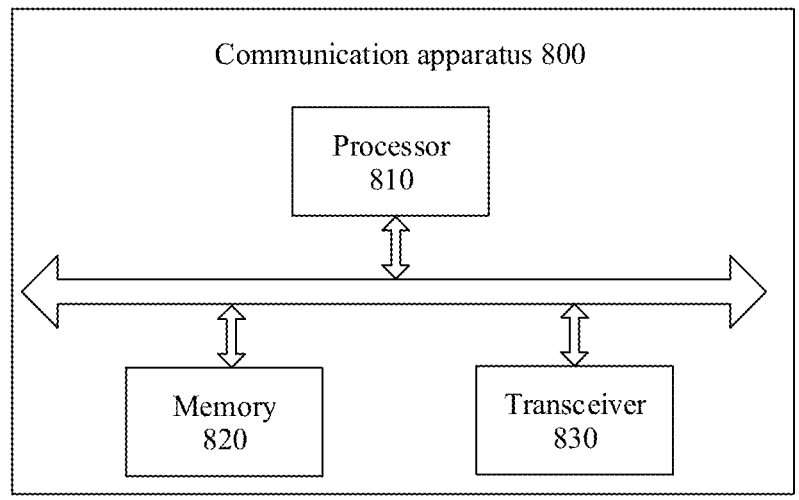
FIG. 15 is a schematic diagram of another communication apparatus according to an embodiment of this application.

It should be understood that the transceiver module 720 may be implemented by a transceiver, the processing module 710 may be implemented by a processor, and the storage module 730 may be implemented by a memory. As shown in FIG. 15, a communication apparatus 800 may include a processor 810, a memory 820, and a transceiver 830.

The communication apparatus 700 shown in FIG. 14 or the communication apparatus 800 shown in FIG. 15 is capable of implementing the steps performed in the foregoing embodiments of the method 200 and the embodiment shown in FIG. 9. For similar descriptions, refer to the descriptions in the foregoing corresponding method 200. To avoid repetition, details are not described herein again.

It should be further understood that the communication apparatus 700 shown in FIG. 14 or the communication apparatus 800 shown in FIG. 15 may be a terminal device or a network device.

It should be further understood that division of the units in the foregoing apparatus is merely logical function division. In an actual implementation, all or some of the units may be integrated into one physical entity, or the units may be physically separated. In addition, all the units in the apparatus may be implemented in a form of software invoked by a processing element; or all the units may be implemented in a form of hardware; or some units may be implemented in a form of software invoked by a processing element, and some units may be implemented in a form of hardware. For example, each unit may be an independently disposed processing element; or may be integrated into a chip of the apparatus for implementation; or may be stored in a memory in a form of a program, so that the program is invoked by a processing element of the apparatus to perform a function of the unit. The processing element herein may also be referred to as a processor, and may be an integrated circuit with a signal processing capability. In an implementation process, steps in the foregoing methods or the foregoing units can be implemented by using a hardware integrated logical circuit in the processing element, or by using instructions in a form of software.

In an example, the units in any one of the foregoing apparatuses may be one or more integrated circuits configured to implement the foregoing methods, for example, one or more application-specific integrated circuits (application specific integrated circuit, ASIC), one or more digital signal processors (digital signal processor, DSP), one or more field programmable gate arrays (field programmable gate array, FPGA), or a combination of at least two of these integrated circuit forms. For another example, when the units in the apparatus may be implemented in a form of a program scheduled by a processing element, the processing element may be a general-purpose processor such as a central processing unit (central processing unit, CPU), or another processor capable of invoking the program. For another example, the units may be integrated and implemented in a form of a system-on-a-chip (system-on-a-chip, SOC).

The communication apparatus in the apparatus embodiments may exactly correspond to the first device or the second device in the method embodiments, and corresponding modules or units perform corresponding steps. For example, when the apparatus is implemented by a chip, the receiving unit may be an interface circuit used by the chip to receive a signal from another chip or apparatus. The foregoing sending unit is an interface circuit of the apparatus, and is configured to send a signal to another apparatus. For example, when the apparatus is implemented by a chip, the sending unit is an interface circuit used by the chip to send a signal to another chip or apparatus.

An embodiment of this application further provides a communication system. The communication system includes the first device and the second device.

An embodiment of this application further provides a computer-readable medium, configured to store computer program code. The computer program code includes instructions used to perform the information transmission method in the embodiments of this application in the method 100 and the method 200. The readable medium may be a read-only memory (read-only memory, ROM) or a random access memory (random access memory, RAM). This is not limited in this embodiment of this application.

This application further provides a computer program product. The computer program product includes instructions. When the instructions are executed, the first device and the second device are enabled to perform corresponding operations in the embodiments corresponding to the foregoing methods.

An embodiment of this application further provides a system chip. The system chip includes a processing unit and a communication unit. For example, the processing unit may be a processor, and the communication unit may be an input/output interface, a pin, or a circuit. The processing unit may execute computer instructions, so that the system chip in the communication apparatus performs any information transmission method provided in the embodiments of this application.

Optionally, the computer instructions are stored in a storage unit.

Optionally, the storage unit is a storage unit in the chip, for example, a register or a cache. Alternatively, the storage unit may be a storage unit that is in a terminal and that is located outside the chip, for example, a read-only memory (read-only memory, ROM), another type of static storage device capable of storing static information and instructions, or a random access memory (random access memory, RAM). Any aforementioned processor may be a CPU, a microprocessor, an ASIC, or one or more integrated circuits configured to control execution of a program for the foregoing information transmission method. The processing unit and the storage unit may be decoupled, separately disposed on different physical devices, and connected in a wired or wireless manner to implement functions of the processing unit and the storage unit respectively, so as to support the system chip in implementing various functions in the foregoing embodiments. Alternatively, the processing unit and the storage unit may be coupled on one device.

It may be understood that the memory in the embodiments of this application may be a volatile memory or a nonvolatile memory, or may include a volatile memory and a nonvolatile memory. The nonvolatile memory may be a read-only memory ROM, a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a RAM that serves as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch Link DRAM, SLDRAM), and a direct rambus dynamic random access memory (Direct Rambus RAM, DR RAM).

The terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

In this application, names may be assigned to various objects such as messages, information, devices, network elements, systems, apparatuses, actions, operations, procedures, and concepts. It can be understood that the specific names do not constitute any limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

In the embodiments of this application, unless there is a particular description or a logical conflict, terms and/or descriptions in different embodiments are consistent and may be mutually referenced. Technical features in different embodiments may be combined based on their internal logical relationship to form a new embodiment.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer-readable storage medium may be any usable medium accessible by a computer, or a data storage device, such as a server or a data center, integrating one or more usable media.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. An information transmission method, comprising:
   sending, by a first device, target wake time (TWT) resource configuration information in a first basic service set (BSS) to a second device, wherein the first device is located in the first BSS, the second device is located in a second BSS, and the first BSS and the second BSS at least partially overlap;
   obtaining, by the first device, TWT resource configuration information in the second BSS; and
   determining, by the first device, a data transmission resource in the first BSS based on the TWT resource configuration information in the second BSS,
   wherein a ratio of a quantity of data transmission resources in the first BSS to a total quantity of resources is less than a first threshold, and the total quantity of resources is a sum of the quantity of data transmission resources in the first BSS and a quantity of data transmission resources in the second BSS.

2. The method according to claim 1, wherein the total quantity of resources is total bandwidth or a total quantity of slots, and the first threshold is 1/(N+1), wherein N is a quantity of BSSs overlapping with the first BSS.

3. The method according to claim 1, wherein the TWT resource configuration information in the first BSS comprises one or more of the following fields:
    a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

4. The method according to claim 3, wherein the TWT resource configuration information in the first BSS comprises the following fields:
    an element identifier (ID) field, a length field, an information element ID extension field, a TWT coordination control field, a number of TWT period field and at least one per TWT period info field, wherein
    the TWT coordination control field comprises a TWT coordination enabled field and a number of overlapping BSS/access point (AP) field; and
    the per TWT period info field comprises a target wake time field, a TWT wake duration field, a TWT channel field, a spatial reuse allowed field, and an access class field.

5. The method according to claim 3, wherein the TWT resource configuration information in the first BSS further comprises one or more of the following fields:
    a field indicating whether a TWT period is periodic, and a field indicating a TWT wake interval.

6. The method according to claim 5, wherein the TWT resource configuration information in the first BSS comprises the following fields:
    an element identifier (ID) field, a length field, an information element ID extension field, a TWT coordination control field, and a TWT coordination information field, wherein
    the TWT coordination control field comprises a TWT coordination enabled field, a number of overlapping BSS/access point (AP) field, a periodic field or an aperiodic field, and a reserved field, wherein
    when the TWT coordination control field comprises the periodic field, the TWT coordination information field comprises a target wake time field, a TWT wake duration field, a TWT wake interval mantissa field, a TWT wake interval exponent field, a TWT channel field, a spatial reuse allowed field, and an access class field; or
    when the TWT coordination control field comprises the aperiodic field, the TWT coordination information field comprises a number of TWT period field and at least one per TWT period info field, wherein the per TWT period info field comprises a target wake time field, a TWT wake duration field, a TWT channel field, a spatial reuse allowed field, and an access class field.

7. The method according to claim 1, wherein the TWT resource configuration information in the first BSS is carried in a beacon frame.

8. An information transmission method, comprising:
    receiving, by a second device, target wake time (TWT) resource configuration information in a first basic service set (BSS) sent by a first device, wherein the first device is located in the first BSS, the second device is located in a second BSS, and the first BSS and the second BSS at least partially overlap; and
    determining, by the second device based on the TWT resource configuration information in the first BSS, a data transmission resource in the second BSS,
    wherein a ratio of a quantity of data transmission resources in the second BSS to a total quantity of resources is less than a second threshold, and the total quantity of resources is a sum of the quantity of data transmission resources in the first BSS and a quantity of data transmission resources in the second BSS.

9. The method according to claim 8, wherein the total quantity of resources is total bandwidth or a total quantity of slots, and the second threshold is 1/(S+1), wherein S is a quantity of BSSs overlapping with the second BSS.

10. The method according to claim 8, wherein the TWT resource configuration information in the first BSS comprises one or more of the following fields:
    a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

11. The method according to claim 10, wherein the TWT resource configuration information in the first BSS comprises the following fields:
    an element identifier (ID) field, a length field, an information element ID extension field, a TWT coordination control field, a number of TWT period field and at least one per TWT period info field, wherein
    the TWT coordination control field comprises a TWT coordination enabled field and a number of overlapping BSS/access point (AP) field; and
    the per TWT period info field comprises a target wake time field, a TWT wake duration field, a TWT channel field, a spatial reuse allowed field, and an access class field.

12. The method according to claim 10, wherein the TWT resource configuration information in the first BSS further comprises one or more of the following fields:
    a field indicating whether a TWT period is periodic, and a field indicating a TWT wake interval.

13. The method according to claim 12, wherein the TWT resource configuration information in the first BSS comprises the following fields:
    an element identifier (ID) field, a length field, an information element ID extension field, a TWT coordination control field, and a TWT coordination information field, wherein
    the TWT coordination control field comprises a TWT coordination enabled field, a number of overlapping BSS/access point (AP) field, a periodic field or an aperiodic field, and a reserved field, wherein
    when the TWT coordination control field comprises the periodic field, the TWT coordination information field comprises a target wake time field, a TWT wake duration field, a TWT wake interval mantissa field, a TWT wake interval exponent field, a TWT channel field, a spatial reuse allowed field, and an access class field; or
    when the TWT coordination control field comprises the aperiodic field, the TWT coordination information field comprises a number of TWT period field and at least one per TWT period info field, wherein the per TWT period info field comprises a target wake time field, a TWT wake duration field, a TWT channel field, a spatial reuse allowed field, and an access class field.

14. The method according to claim 8, wherein the TWT resource configuration information in the first BSS is carried in a beacon frame.

15. A first device, comprising:
a processor; and
a memory having instructions stored thereon that, when executed by the processor, cause the first device to:
send target wake time (TWT) resource configuration information in a first basic service set (BSS) to a second device, wherein the first device is located in the first BSS, the second device is located in a second BSS, and the first BSS and the second BSS at least partially overlap;
obtain TWT resource configuration information in the second BSS; and
determine a data transmission resource in the first BSS based on the TWT resource configuration information in the second BSS,
wherein a ratio of a quantity of data transmission resources in the first BSS to a total quantity of resources is less than a first threshold, and the total quantity of resources is a sum of the quantity of data transmission resources in the first BSS and a quantity of data transmission resources in the second BSS.

16. The first device according to claim 15, wherein the total quantity of resources is total bandwidth or a total quantity of slots, and the first threshold is 1/(N+1), wherein N is a quantity of BSSs overlapping with the first BSS.

17. The first device according to claim 15, wherein the TWT resource configuration information in the first BSS comprises one or more of the following fields:
a field indicating whether a TWT is coordination-enabled in a plurality of BSSs, a field indicating a quantity of BSSs overlapping with the first BSS, a field indicating a quantity of TWT periods, a field indicating a start time of a TWT period, a field indicating duration of a TWT period, a field indicating a channel in a TWT period, a field indicating whether spatial reuse is allowed in a TWT period, and a field indicating an access class in a TWT period.

18. The first device according to claim 17, wherein the TWT resource configuration information in the first BSS comprises the following fields:
an element identifier (ID) field, a length field, an information element ID extension field, a TWT coordination control field, a number of TWT period field and at least one per TWT period info field, wherein
the TWT coordination control field comprises a TWT coordination enabled field and a number of overlapping BSS/access point (AP) field; and
the per TWT period info field comprises a target wake time field, a TWT wake duration field, a TWT channel field, a spatial reuse allowed field, and an access class field.

19. The first device according to claim 17, wherein the TWT resource configuration information in the first BSS further comprises one or more of the following fields:
a field indicating whether a TWT period is periodic, and
a field indicating a TWT wake interval.

20. The first device according to claim 19, wherein the TWT resource configuration information in the first BSS comprises the following fields:
an element identifier (ID) field, a length field, an information element ID extension field, a TWT coordination control field, and a TWT coordination information field, wherein
the TWT coordination control field comprises a TWT coordination enabled field, a number of overlapping BSS/access point (AP) field, a periodic field or an aperiodic field, and a reserved field, wherein
when the TWT coordination control field comprises the periodic field, the TWT coordination information field comprises a target wake time field, a TWT wake duration field, a TWT wake interval mantissa field, a TWT wake interval exponent field, a TWT channel field, a spatial reuse allowed field, and an access class field; or
when the TWT coordination control field comprises the aperiodic field, the TWT coordination information field comprises a number of TWT period field and at least one per TWT period info field, wherein the per TWT period info field comprises a target wake time field, a TWT wake duration field, a TWT channel field, a spatial reuse allowed field, and an access class field.

* * * * *